(12) United States Patent
Wittbold et al.

(10) Patent No.: US 9,909,718 B2
(45) Date of Patent: Mar. 6, 2018

(54) MULTIPLE-LEG DISCHARGE BOOT FOR SLURRY DISTRIBUTION

(71) Applicant: United States Gypsum Company, Chicago, IL (US)

(72) Inventors: James Wittbold, Des Plaines, IL (US); Alfred C. Li, Naperville, IL (US); Chris C. Lee, Deerfield, IL (US); Cesar Chan, Libertyville, IL (US); William Rago, Gurnee, IL (US); Weixin D. Song, Vernon Hills, IL (US)

(73) Assignee: United States Gypsum Company, Chicago, IL (US)

( * ) Notice: Subject to any disclaimer, the term of this patent is extended or adjusted under 35 U.S.C. 154(b) by 357 days.

(21) Appl. No.: 13/659,672

(22) Filed: Oct. 24, 2012

(65) Prior Publication Data

US 2013/0100759 A1    Apr. 25, 2013

Related U.S. Application Data

(60) Provisional application No. 61/550,885, filed on Oct. 24, 2011, provisional application No. 61/550,873, filed on Oct. 24, 2011.

(51) Int. Cl.
  *B28C 5/00* (2006.01)
  *F17D 1/08* (2006.01)
  (Continued)

(52) U.S. Cl.
  CPC ............ *F17D 1/08* (2013.01); *B28B 19/0092* (2013.01); *B28C 5/00* (2013.01); *B28C 5/003* (2013.01);
  (Continued)

(58) Field of Classification Search
  CPC .. F17D 1/08; B28C 5/00; B28C 5/003; B28C 5/0881; F16L 41/023; B28B 19/0092; Y10T 137/85938
  See application file for complete search history.

(56) References Cited

U.S. PATENT DOCUMENTS 1,452,702 A    4/1923 Pipe
1,905,733 A *  4/1933 Moore .......................... 137/101
               (Continued)

FOREIGN PATENT DOCUMENTS

AT    402826 B  *  7/1997
CN    1954166 A     4/2007
               (Continued)

OTHER PUBLICATIONS

Burrows, "A Decade's Experience of Gypsum Board Weight Reduction in the U.S.", 14. Internationale Baustofftagung (Weimar, Sep. 20-23, 2000), 1.0197-1.0207.
(Continued)

*Primary Examiner* — Charles Cooley
(74) *Attorney, Agent, or Firm* — Leydig, Voit & Mayer, Ltd.; Philip T. Petti; Pradip K. Sahu

(57) ABSTRACT

A multi-leg discharge boot can include an inlet conduit and first and second outlet conduits separated by a junction portion. The inlet conduit includes an entry segment, a transition segment and a heel portion disposed therebetween. The inlet conduit can include an inlet end and a junction end. A junction portion is disposed at the junction end of the inlet conduit between first and second junction openings. The junction portion includes a substantially planar wall region that is substantially perpendicular to a main flow discharge axis.

24 Claims, 11 Drawing Sheets

(51) Int. Cl.
  *B28B 19/00* (2006.01)
  *B28C 5/08* (2006.01)
  *F16L 41/02* (2006.01)
(52) U.S. Cl.
  CPC .......... *B28C 5/0881* (2013.01); *F16L 41/023* (2013.01); *Y10T 137/85938* (2015.04)

(56) References Cited

U.S. PATENT DOCUMENTS

| | | | |
|---|---|---|---|
| 2,097,613 A | 11/1937 | Batcheller | |
| 2,203,072 A | 6/1940 | Albright | |
| 2,660,416 A | 11/1953 | Camp et al. | |
| 2,700,622 A | 1/1955 | Burwell | |
| 2,882,716 A | 4/1959 | Anderson | |
| 2,998,198 A | 8/1961 | Young | |
| 3,053,314 A | 9/1962 | McGillis et al. | |
| 3,083,756 A | 4/1963 | Page et al. | |
| 3,196,864 A | 7/1965 | Johnson | |
| 3,198,867 A | 8/1965 | Siggers | |
| 3,266,974 A | 8/1966 | Staver, Jr. | |
| 3,296,346 A | 1/1967 | Shannon | |
| 3,297,601 A | 1/1967 | Ptasieaski et al. | |
| 3,359,146 A | 12/1967 | Lane et al. | |
| 3,363,769 A | 1/1968 | Wilmot et al. | |
| 3,380,333 A | 4/1968 | Clay et al. | |
| 3,400,190 A | 9/1968 | Donald | |
| 3,415,920 A | 12/1968 | Lee et al. | |
| 3,432,588 A | 3/1969 | Breidt et al. | |
| 3,437,172 A | 4/1969 | Allen | |
| 3,458,907 A | 8/1969 | Shannon | |
| 3,459,620 A | 8/1969 | McCleary et al. | |
| 3,467,281 A | 9/1969 | Archer | |
| 3,494,993 A | 2/1970 | Breidt et al. | |
| 3,532,781 A | 10/1970 | Shannon | |
| 3,558,380 A | 1/1971 | Pook | |
| 3,583,681 A | 6/1971 | Brown | |
| 3,602,405 A | 8/1971 | Ames | |
| 3,644,169 A | 2/1972 | Phillips | |
| 3,663,562 A | 5/1972 | Magerlein et al. | |
| 3,740,027 A | 6/1973 | Kormos | |
| 3,760,036 A | 9/1973 | Matthews | |
| 3,781,320 A | 12/1973 | Irwin | |
| 3,795,259 A * | 3/1974 | Brandin et al. ........... | 137/561 A |
| 3,841,530 A | 10/1974 | Janninck | |
| 3,909,170 A | 9/1975 | Riboulet et al. | |
| 3,959,431 A | 5/1976 | Nissel | |
| 3,959,432 A | 5/1976 | Wiley | |
| 4,110,061 A | 8/1978 | Gerritsen | |
| 4,113,829 A | 9/1978 | Bowker et al. | |
| 4,153,403 A | 5/1979 | Schneider | |
| 4,175,591 A | 11/1979 | Welker | |
| 4,181,647 A | 1/1980 | Beach | |
| 4,187,275 A | 2/1980 | Bracalielly et al. | |
| 4,190,144 A | 2/1980 | Lybbert | |
| 4,268,236 A | 5/1981 | Peille | |
| 4,279,673 A | 7/1981 | White et al. | |
| 4,288,263 A | 9/1981 | Delcoigne et al. | |
| 4,334,786 A | 6/1982 | Delcoigne et al. | |
| 4,354,885 A | 10/1982 | White | |
| 4,361,254 A | 11/1982 | Teraoku et al. | |
| 4,364,790 A | 12/1982 | Delcoigne et al. | |
| 4,392,613 A | 7/1983 | Graff et al. | |
| 4,474,477 A | 10/1984 | Smith et al. | |
| 4,533,300 A | 8/1985 | Westerlund et al. | |
| 4,557,261 A | 12/1985 | Rugheimer | |
| 4,588,299 A | 5/1986 | Brown et al. | |
| 4,618,294 A | 10/1986 | Brown | |
| 4,664,611 A | 5/1987 | Kumar | |
| 4,758,261 A | 7/1988 | Parker et al. | |
| 4,819,878 A | 4/1989 | Bailey et al. | |
| 4,827,921 A | 5/1989 | Rugheimer | |
| 4,934,596 A | 6/1990 | Hilton et al. | |
| 4,942,003 A | 7/1990 | Bold | |
| 5,186,455 A | 2/1993 | Hammerstedt | |
| 5,192,384 A | 3/1993 | Barrier et al. | |
| 5,211,511 A | 5/1993 | Deal, Jr. | |
| 5,211,965 A | 5/1993 | Kitagawa | |
| 5,261,485 A | 11/1993 | Thornton et al. | |
| 5,316,703 A | 5/1994 | Schrenk | |
| 5,320,677 A | 6/1994 | Baig | |
| 5,350,250 A | 9/1994 | Honings | |
| 5,386,943 A | 2/1995 | Peeters | |
| 5,395,653 A | 3/1995 | Baum | |
| 5,508,072 A | 4/1996 | Andersen et al. | |
| 5,520,779 A | 5/1996 | Bold | |
| 5,580,409 A | 12/1996 | Andersen et al. | |
| 5,582,670 A | 12/1996 | Andersen et al. | |
| 5,622,729 A | 4/1997 | Mower | |
| 5,643,510 A | 7/1997 | Sucech | |
| 5,660,903 A | 8/1997 | Andersen et al. | |
| 5,660,904 A | 8/1997 | Andersen et al. | |
| 5,665,442 A | 9/1997 | Andersen et al. | |
| 5,679,381 A | 10/1997 | Andersen et al. | |
| 5,683,635 A | 11/1997 | Sucech et al. | |
| 5,709,593 A | 1/1998 | Guthrie et al. | |
| 5,714,001 A | 2/1998 | Savoly et al. | |
| 5,718,797 A | 2/1998 | Phillips et al. | |
| 5,720,913 A | 2/1998 | Andersen et al. | |
| 5,730,819 A | 3/1998 | Retti | |
| 5,766,525 A | 6/1998 | Andersen et al. | |
| 5,792,322 A * | 8/1998 | Hergert et al. ............... | 162/258 |
| 5,794,642 A * | 8/1998 | Zikeli et al. ...................... | 137/4 |
| 5,800,647 A | 9/1998 | Andersen et al. | |
| 5,844,051 A | 12/1998 | Onzuka et al. | |
| 5,879,486 A | 3/1999 | Philips et al. | |
| 5,879,722 A | 3/1999 | Andersen et al. | |
| 5,908,240 A | 6/1999 | Hood et al. | |
| 5,972,426 A | 10/1999 | Kutsuzawa et al. | |
| 5,997,691 A | 12/1999 | Gautam et al. | |
| 6,057,000 A | 5/2000 | Cai | |
| 6,059,444 A | 5/2000 | Johnson et al. | |
| 6,123,445 A | 9/2000 | Grassi | |
| 6,153,040 A | 11/2000 | Rohlf et al. | |
| 6,154,947 A | 12/2000 | Koebbe | |
| 6,176,036 B1 | 1/2001 | Pease | |
| 6,276,946 B1 | 8/2001 | Stephan | |
| 6,286,422 B1 | 9/2001 | Lin et al. | |
| 6,323,159 B1 | 11/2001 | Raza | |
| 6,340,123 B1 | 1/2002 | Lee et al. | |
| 6,342,284 B1 | 1/2002 | Yu et al. | |
| 6,363,967 B1 * | 4/2002 | Tanaka et al. ................ | 137/597 |
| 6,382,922 B1 | 5/2002 | Lewis et al. | |
| 6,402,062 B1 | 6/2002 | Bendig et al. | |
| 6,409,823 B1 | 6/2002 | Shake et al. | |
| 6,416,695 B1 | 7/2002 | Miller | |
| 6,427,877 B1 | 8/2002 | Trout | |
| 6,471,799 B1 | 10/2002 | Sasaki et al. | |
| 6,494,609 B1 | 12/2002 | Wittbold et al. | |
| 6,524,388 B1 | 2/2003 | Yamada et al. | |
| 6,616,985 B2 | 9/2003 | Powell et al. | |
| 6,632,550 B1 | 10/2003 | Yu et al. | |
| 6,635,214 B2 | 10/2003 | Rapacki et al. | |
| 6,645,483 B2 | 11/2003 | McGhee | |
| 6,699,364 B2 | 3/2004 | Song et al. | |
| 6,699,426 B1 | 3/2004 | Burke | |
| 6,752,895 B1 | 6/2004 | Song et al. | |
| 6,774,146 B2 | 8/2004 | Savoly et al. | |
| 6,800,131 B2 | 10/2004 | Yu et al. | |
| 6,872,280 B2 | 3/2005 | Tanaka et al. | |
| 6,874,930 B2 | 4/2005 | Wittbold et al. | |
| 6,878,321 B2 | 4/2005 | Hauber et al. | |
| 6,991,361 B2 | 1/2006 | Flood | |
| 7,007,914 B2 | 3/2006 | Petersen et al. | |
| 7,127,865 B2 | 10/2006 | Douglas | |
| 7,160,389 B2 | 1/2007 | Gibson et al. | |
| 7,172,403 B2 | 2/2007 | Burke | |
| 7,255,123 B2 * | 8/2007 | Cedergaard et al. .......... | 137/262 |
| 7,296,919 B2 * | 11/2007 | Petersen et al. .................. | 366/3 |
| 7,364,676 B2 | 4/2008 | Sucech | |
| 7,458,532 B2 * | 12/2008 | Sloan ............................ | 239/593 |
| 7,475,599 B2 | 1/2009 | Frank et al. | |
| 7,588,634 B2 | 9/2009 | Lynn et al. | |
| 7,690,834 B2 | 4/2010 | Nakamura et al. | |
| 7,718,019 B2 | 5/2010 | Wittbold et al. | |

(56) References Cited

U.S. PATENT DOCUMENTS

| | | | |
|---|---|---|---|
| 7,731,794 B2 | 6/2010 | Yu et al. | |
| 7,736,720 B2 | 6/2010 | Yu et al. | |
| 7,771,851 B2 | 8/2010 | Song et al. | |
| 7,875,114 B2 | 1/2011 | Wittbold et al. | |
| 7,875,192 B2 | 1/2011 | Eigenmann et al. | |
| 7,980,922 B2 | 7/2011 | Kiesel et al. | |
| 8,016,960 B2 | 9/2011 | Wittbold et al. | |
| 8,030,377 B2 | 10/2011 | Dubey et al. | |
| 8,038,790 B1 | 10/2011 | Dubey et al. | |
| 8,057,915 B2 | 11/2011 | Song et al. | |
| 8,062,741 B2 | 11/2011 | Tonyan et al. | |
| 8,088,218 B2 | 1/2012 | Blackburn et al. | |
| 8,119,207 B2 | 2/2012 | Rigaudon et al. | |
| 8,128,126 B2 * | 3/2012 | Poupore et al. | 285/131.1 |
| 8,142,859 B2 | 3/2012 | Domey et al. | |
| 8,142,915 B2 | 3/2012 | Blackburn et al. | |
| 8,177,541 B2 | 5/2012 | Fahey | |
| 8,197,952 B2 | 6/2012 | Yu et al. | |
| 8,257,489 B2 | 9/2012 | Yu et al. | |
| 8,360,825 B2 | 1/2013 | Hsu et al. | |
| 8,444,787 B2 | 5/2013 | Wittbold et al. | |
| 8,475,762 B2 | 7/2013 | Li et al. | |
| 8,597,426 B2 | 12/2013 | Lee et al. | |
| 8,685,188 B2 | 4/2014 | Yamaji | |
| 8,801,852 B2 | 8/2014 | Lee et al. | |
| 9,296,124 B2 * | 3/2016 | Rago | B29C 33/30 |
| 9,579,822 B2 * | 2/2017 | Li | B05C 5/0254 |
| 2002/0045074 A1 | 4/2002 | Yu et al. | |
| 2002/0056690 A1 | 5/2002 | Wegner | |
| 2003/0049450 A1 | 3/2003 | Song et al. | |
| 2003/0068959 A1 | 4/2003 | Kajiwara et al. | |
| 2003/0117891 A1 | 6/2003 | Wittbold et al. | |
| 2003/0200714 A1 | 10/2003 | Minke et al. | |
| 2004/0033314 A1 | 2/2004 | Rao et al. | |
| 2004/0033324 A1 | 2/2004 | Meyer | |
| 2004/0091406 A1 | 5/2004 | Wolfert et al. | |
| 2004/0231916 A1 | 11/2004 | Englert et al. | |
| 2005/0019618 A1 | 1/2005 | Yu et al. | |
| 2005/0103347 A1 | 5/2005 | Curti et al. | |
| 2005/0253098 A1 | 11/2005 | Petersen et al. | |
| 2006/0035112 A1 | 2/2006 | Veeramasuneni et al. | |
| 2006/0092759 A1 | 5/2006 | Petersen et al. | |
| 2006/0198995 A1 | 9/2006 | Nideborn et al. | |
| 2006/0243171 A1 | 11/2006 | Yu et al. | |
| 2006/0244182 A1 | 11/2006 | Wittbold et al. | |
| 2006/0244183 A1 | 11/2006 | Wittbold et al. | |
| 2006/0278133 A1 | 12/2006 | Yu et al. | |
| 2006/0283974 A1 | 12/2006 | Eguchi et al. | |
| 2007/0022913 A1 | 2/2007 | Wang et al. | |
| 2007/0048490 A1 | 3/2007 | Yu et al. | |
| 2007/0048549 A1 | 3/2007 | Song et al. | |
| 2007/0059513 A1 | 3/2007 | Yu et al. | |
| 2007/0251628 A1 | 11/2007 | Yu et al. | |
| 2008/0000392 A1 | 1/2008 | Blackburn et al. | |
| 2008/0009565 A1 | 1/2008 | Wittbold et al. | |
| 2008/0069762 A1 | 3/2008 | Lynn et al. | |
| 2008/0090068 A1 | 4/2008 | Yu et al. | |
| 2008/0110276 A1 | 5/2008 | Frank et al. | |
| 2008/0141909 A1 | 6/2008 | Immordino et al. | |
| 2008/0299413 A1 | 12/2008 | Song et al. | |
| 2009/0090796 A1 | 4/2009 | Tian | |
| 2009/0134550 A1 | 5/2009 | Dehennau et al. | |
| 2009/0239977 A1 | 9/2009 | Dubey et al. | |
| 2009/0257303 A1 | 10/2009 | Rayner et al. | |
| 2009/0297765 A1 | 12/2009 | Domey et al. | |
| 2010/0077939 A1 | 4/2010 | Trout | |
| 2010/0081008 A1 | 4/2010 | Trout | |
| 2010/0139528 A1 | 6/2010 | Yu et al. | |
| 2010/0227073 A1 | 9/2010 | Frank et al. | |
| 2010/0229714 A1 | 9/2010 | Tonyan et al. | |
| 2010/0239886 A1 | 9/2010 | Yu et al. | |
| 2010/0291305 A1 | 11/2010 | Wittbold et al. | |
| 2011/0054053 A1 | 3/2011 | Lee et al. | |
| 2011/0186664 A1 | 8/2011 | Lucas et al. | |
| 2011/0192518 A1 | 8/2011 | Li | |
| 2011/0195241 A1 | 8/2011 | Yu et al. | |
| 2011/0211418 A1 | 9/2011 | Tassone et al. | |
| 2011/0213043 A1 | 9/2011 | Blackburn et al. | |
| 2011/0213085 A1 | 9/2011 | Tonelli et al. | |
| 2011/0220586 A1 | 9/2011 | Levitt | |
| 2011/0271903 A1 | 11/2011 | Durst et al. | |
| 2011/0308432 A1 | 12/2011 | Wittbold et al. | |
| 2012/0131857 A1 | 5/2012 | Ross-da Silva | |
| 2012/0167805 A1 | 7/2012 | Wittbold et al. | |
| 2012/0168527 A1 * | 7/2012 | Li et al. | 239/1 |
| 2012/0170403 A1 * | 7/2012 | Li et al. | 366/177.1 |
| 2012/0251813 A1 | 10/2012 | Yu et al. | |
| 2012/0304545 A1 | 12/2012 | Park et al. | |
| 2012/0308463 A1 * | 12/2012 | Li et al. | 423/265 |
| 2013/0098268 A1 * | 4/2013 | Li et al. | 106/638 |
| 2013/0099027 A1 * | 4/2013 | Li et al. | 239/601 |
| 2013/0099418 A1 * | 4/2013 | Li et al. | 264/301 |
| 2013/0100759 A1 * | 4/2013 | Wittbold et al. | 366/3 |
| 2013/0216717 A1 * | 8/2013 | Rago et al. | 427/427 |
| 2013/0233880 A1 * | 9/2013 | Rago et al. | 222/1 |
| 2013/0308411 A1 * | 11/2013 | Wittbold et al. | 366/2 |
| 2014/0073711 A1 | 3/2014 | Lee et al. | |
| 2014/0090730 A1 * | 4/2014 | Buettner et al. | 137/561 A |
| 2015/0231799 A1 * | 8/2015 | Wittbold | |
| 2017/0210029 A1 * | 7/2017 | Li | B28B 19/0092 |

FOREIGN PATENT DOCUMENTS

| | | | |
|---|---|---|---|
| CN | 2928447 Y | 8/2007 | |
| CN | 201685321 U | 12/2010 | |
| CN | 204076480 U | 1/2015 | |
| CN | 203957095 U | 11/2016 | |
| DE | 353695 | 5/1922 | |
| DE | 3808698 A1 | 9/1989 | |
| DE | 3932573 A1 | 4/1991 | |
| DE | 29514043 U1 | 11/1995 | |
| DE | 19757678 | 6/1999 | |
| DE | 102008041423 | 2/2010 | |
| DE | 202009014417 U1 | 2/2010 | |
| DE | 202011100879 U1 | 6/2011 | |
| DE | 102010010872 A1 | 9/2011 | |
| EP | 0003705 | 2/1979 | |
| EP | 0225261 A1 | 6/1987 | |
| EP | 0997784 | 3/2000 | |
| EP | 1085280 A1 * | 3/2001 | F25B 41/00 |
| EP | 1396696 A2 | 3/2004 | |
| EP | 1491262 A2 | 12/2004 | |
| EP | 2363269 A1 | 9/2011 | |
| EP | 2514294 | 10/2012 | |
| FR | 1357221 | 4/1964 | |
| FR | 2112808 A5 | 6/1972 | |
| GB | 1317359 A | 5/1973 | |
| GB | 1420686 | 1/1976 | |
| GB | 1520258 A | 8/1978 | |
| GB | 2026372 A | 2/1980 | |
| GB | 2044163 A | 10/1980 | |
| GB | 2246694 A | 2/1992 | |
| GB | 2410909 | 8/2005 | |
| JP | 51-90356 U | 7/1976 | |
| JP | 6190845 A | 7/1994 | |
| JP | H0-752130 A | 2/1995 | |
| JP | H0788419 A | 4/1995 | |
| JP | H08-281626 A | 10/1996 | |
| JP | 9094814 A | 4/1997 | |
| JP | H09141700 A | 6/1997 | |
| JP | 9273421 A | 10/1997 | |
| JP | H11-501002 A | 1/1999 | |
| JP | 11148589 | 6/1999 | |
| JP | H11-170235 A | 6/1999 | |
| JP | H11-188301 A | 7/1999 | |
| JP | 2001-300933 A | 10/2001 | |
| JP | 2004130672 | 4/2004 | |
| JP | 2005-021894 A | 1/2005 | |
| JP | 2006095469 A | 4/2006 | |
| JP | 2006334483 A | 12/2006 | |
| JP | 2008-229560 A | 10/2008 | |
| JP | 2009-045513 A | 3/2009 | |
| RU | 2257294 A | 5/2005 | |
| RU | 2313451 C2 | 12/2007 | |

(56) References Cited

FOREIGN PATENT DOCUMENTS

| | | | |
|---|---|---|---|
| TW | I350228 B | 10/2011 | |
| WO | WO 9324290 | 12/1993 | |
| WO | WO 9705305 A1 * | 2/1997 | ............... D01D 1/06 |
| WO | WO 9825069 A1 * | 6/1998 | |
| WO | WO 2004101402 A1 * | 11/2004 | ............. B65G 11/20 |
| WO | WO 2010/142034 A1 | 12/2010 | |
| WO | WO 2011134844 A1 | 11/2011 | |
| WO | WO 2011150455 A1 | 12/2011 | |
| WO | WO 2012076526 | 6/2012 | |
| WO | WO 2012/092534 A1 | 7/2012 | |
| WO | WO 2012/092582 A1 | 7/2012 | |
| WO | WO 2013/063073 A2 | 5/2013 | |
| WO | WO 2013/063080 A2 | 5/2013 | |
| WO | WO 2013063044 A1 * | 5/2013 | |
| WO | WO 2013063055 A2 * | 5/2013 | |
| WO | WO 2013063055 A3 * | 6/2013 | |
| WO | WO 2014/066211 A1 | 5/2014 | |
| WO | WO 2014/066283 A1 | 5/2014 | |

OTHER PUBLICATIONS

International Search Report and Written Opinion from PCT/US2012/061607 (Apr. 29, 2013).

Mueller et al., "Controlling Set Times during Gypsum Board Production: Advance Additive Solutions", Global Gypsum Conference, Oct. 2011.

Peterson, Kurt, "Engineered Gypsum Panels, the Development and Application of Densified Zones at the Paper/Core Interface of Gypsum Panels", Proceedings of Gypsum 2000, 6th International Conference on Natural and Synthetic Gypsum, Toronto, Canada, May 2000, pp. 9-1-9-16.

TeeJet; "TeeJet LF 500 Slurry Controller", http://teejet.com/english/home/products/application-control-and-equipment/slurry-application-controls/teejet--lh-500-slurry-controller.aspx, accessed Jan. 8, 2015.

* cited by examiner

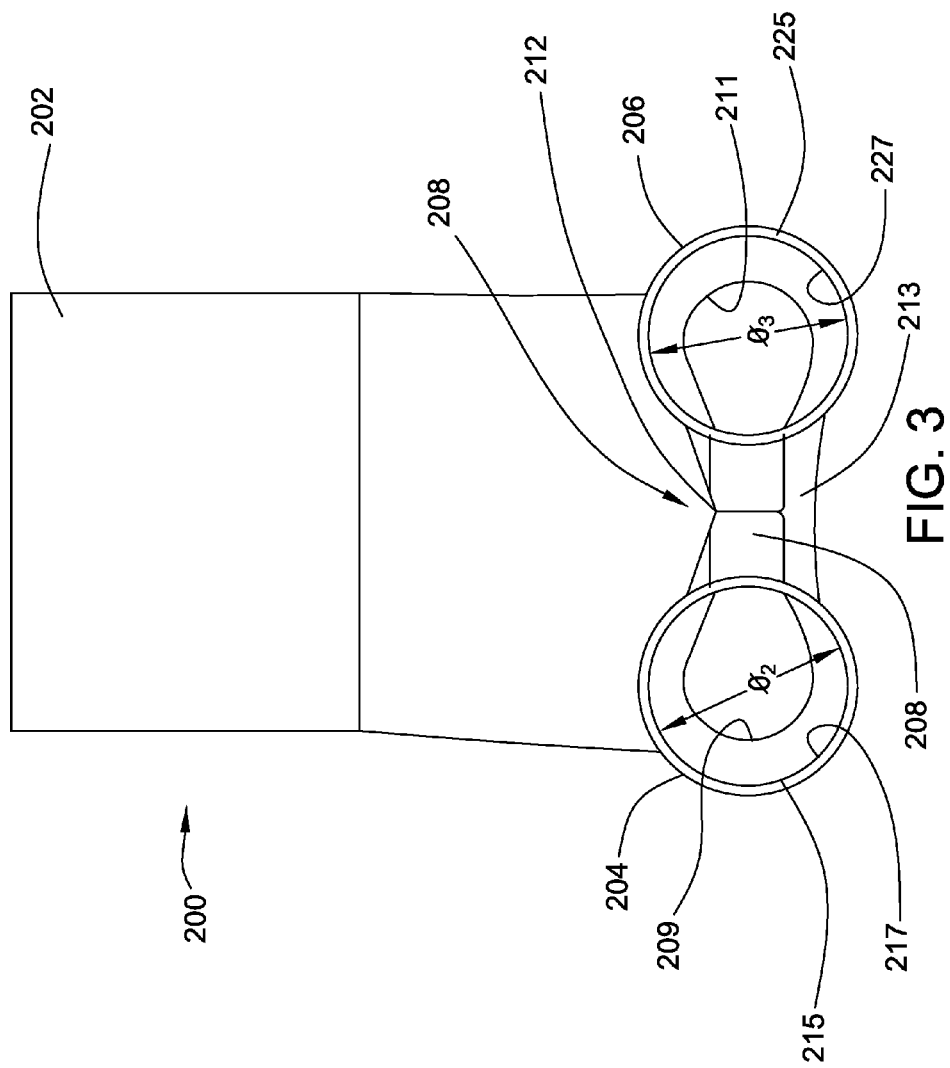

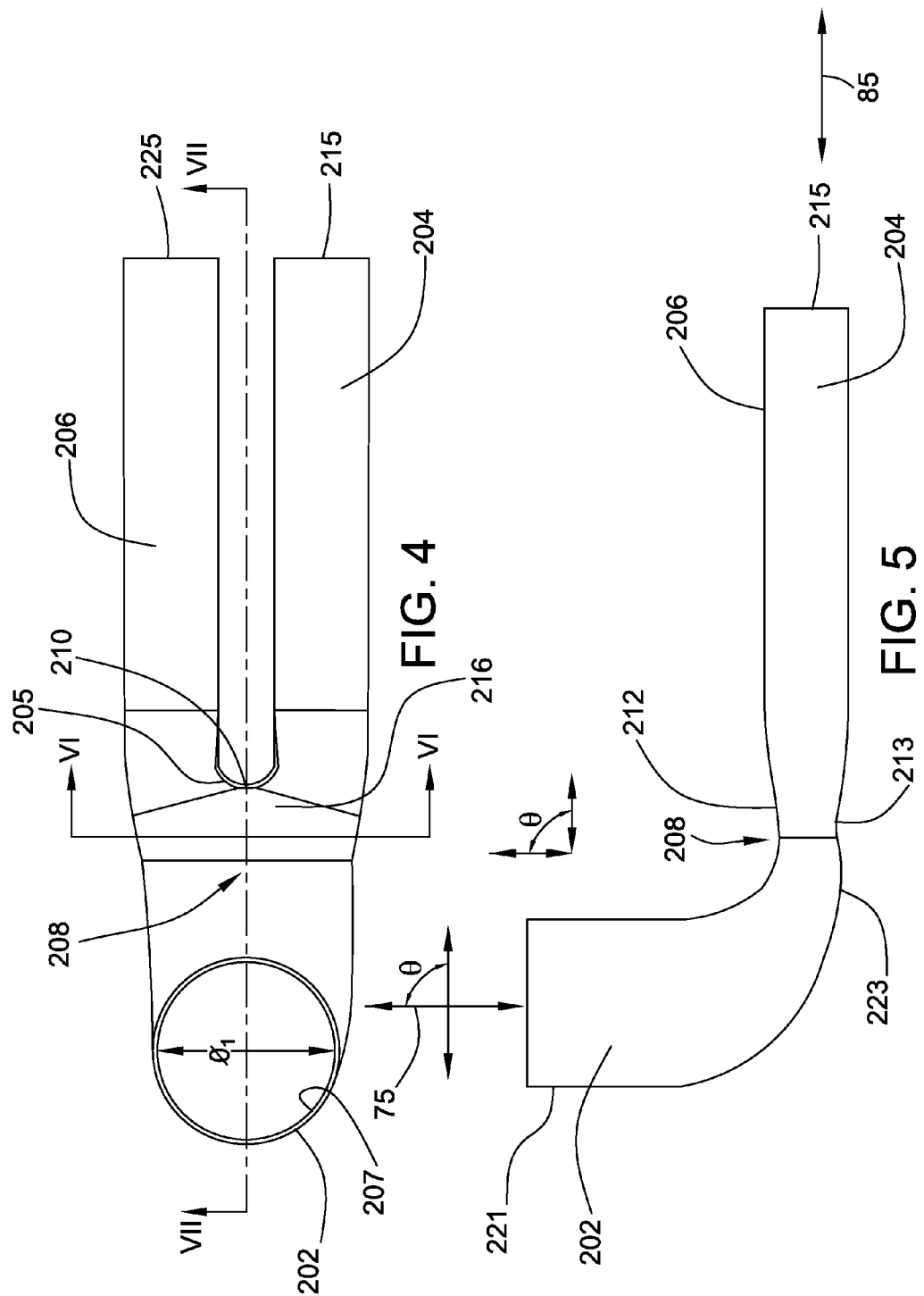

MULTIPLE-LEG DISCHARGE BOOT FOR SLURRY DISTRIBUTION

CROSS-REFERENCE TO RELATED APPLICATIONS

This patent application claims the benefit of priority to U.S. Provisional Patent Application Nos. 61/550,885, filed Oct. 24, 2011, and entitled, "Gypsum Slurry Multiple Leg Boot Design"; and 61/550,873, filed Oct. 24, 2011, and entitled, "Automatic Device for Squeezing Slurry Splitter," which are incorporated in their entireties herein by this reference.

BACKGROUND

The present disclosure relates to continuous board manufacturing processes and, more particularly, to an apparatus, system and method for the distribution of a slurry in connection with the manufacture of a cementitious article.

In many types of cementitious articles, set gypsum (calcium sulfate dihydrate) is often a major constituent. For example, set gypsum is a major component of end products created by use of traditional plasters (e.g., plaster-surfaced internal building walls), and also in faced gypsum board employed in typical drywall construction of interior walls and ceilings of buildings. In addition, set gypsum is the major component of gypsum/cellulose fiber composite boards and products, as described in U.S. Pat. No. 5,320,677. Set gypsum is also included in products that fill and smooth the joints between edges of gypsum board (see, e.g., U.S. Pat. No. 3,297,601). Also, many specialty materials, such as materials useful for modeling and mold-making that are precisely machined, produce products that contain major amounts of set gypsum. Typically, such gypsum-containing cementitious products are made by preparing a mixture of calcined gypsum (calcium sulfate alpha or beta hemihydrate and/or calcium sulfate anhydrite), water, and other components, as appropriate to form a cementitious slurry. In the manufacture of cementitious articles, the cementitious slurry and desired additives are often blended in a continuous mixer, as for example described in U.S. Pat. No. 3,359,146.

For example, in a typical manufacturing process, gypsum board is produced by uniformly dispersing calcined gypsum (commonly referred to as "stucco") in water to form an aqueous calcined gypsum slurry. The aqueous calcined gypsum slurry is typically produced in a continuous manner by inserting stucco and water and other additives into a mixer which contains means for agitating the contents to form a uniform gypsum slurry. The slurry is continuously directed toward and through a discharge outlet of the mixer and into a discharge conduit connected to the discharge outlet of the mixer. An aqueous foam can be combined with the aqueous calcined gypsum slurry in the mixer and/or in the discharge conduit. The stream of slurry passes through the discharge conduit from which it is continuously deposited onto a moving web of cover sheet material supported by a forming table.

The slurry is allowed to spread over the advancing web. A second web of cover sheet material is applied to cover the slurry and form a sandwich structure of a continuous wallboard preform, which is subjected to forming, such as at a conventional forming station, to obtain a desired thickness.

The calcined gypsum reacts with the water in the wallboard preform and sets as a conveyor moves the wallboard preform down a manufacturing line. The wallboard preform is cut into segments at a point along the line where the preform has set sufficiently. The segments are flipped over, dried (e.g., in a kiln) to drive off excess water, and processed to provide the final wallboard product of desired dimensions.

Prior devices and methods for addressing some of the operational problems associated with the production of gypsum wallboard are disclosed in commonly-assigned U.S. Pat. Nos. 5,683,635; 5,643,510; 6,494,609; 6,874,930; 7,007,914; and 7,296,919, which are incorporated by reference.

The weight proportion of water relative to stucco that is combined to form a given amount of finished product is often referred to in the art as the "water-stucco ratio" (WSR). A reduction in the WSR without a formulation change will correspondingly increase the slurry viscosity, thereby reducing the ability of the slurry to spread on the forming table. Reducing water usage (i.e., lowering the WSR) in the gypsum board manufacturing process can yield many advantages, including the opportunity to reduce the energy demand in the process. However, conveying increasingly viscous gypsum slurries through a discharge conduit mounted to the mixer and spreading such slurries uniformly on the forming table remain a great challenge.

It will be appreciated that this background description has been created by the inventors to aid the reader and is not to be taken as an indication that any of the indicated problems were themselves appreciated in the art. While the described principles can, in some aspects and embodiments, alleviate the problems inherent in other systems, it will be appreciated that the scope of the protected innovation is defined by the attached claims and not by the ability of any disclosed feature to solve any specific problem noted herein.

SUMMARY

In one aspect, the present disclosure is directed to embodiments of a multi-leg discharge boot for use in preparing a cementitious product. In embodiments, a multi-leg discharge boot can be placed in fluid communication with a slurry mixer and receive a flow of aqueous cementitious slurry therefrom. In embodiments, a multi-leg discharge boot can include an inlet conduit and first and second outlet conduits separated by a junction portion.

In one embodiment, a multi-leg discharge boot includes an inlet conduit and first and second outlet conduits separated by a junction portion. The inlet conduit includes an entry segment, a transition segment and a heel portion disposed therebetween.

The entry segment has an inlet end defining an inlet opening. The entry segment is disposed along a main flow entry axis extending between the inlet end and the heel portion. The transition segment has a junction end. The transition segment is disposed along a main flow discharge axis extending between the heel portion and the junction end. The junction end defines first and second junction openings. The first junction opening is disposed in spaced relationship to the second junction opening. The heel portion has a surface adapted to direct a flow of slurry moving from the inlet opening along the main flow entry axis through the heel portion to the transition segment along the main flow discharge axis.

The first outlet conduit is in fluid communication with the first junction opening of the inlet conduit. The first outlet conduit includes a discharge end defining a first discharge opening. The second outlet conduit is in fluid communication with the second junction opening of the inlet conduit. The second outlet conduit includes a discharge end defining a second discharge opening.

The junction portion is disposed at the junction end of the inlet conduit. The junction portion is disposed between the first junction opening and the second junction opening. The junction portion includes a substantially planar wall region. The wall region is substantially perpendicular to the main flow discharge axis.

In another embodiment, a multi-leg discharge boot includes an inlet conduit and first and second outlet conduits separated by a junction portion. The inlet conduit includes an entry segment, a transition segment and a heel portion disposed therebetween.

The entry segment has an inlet end defining an inlet opening. The entry segment is disposed along a main flow entry axis extending between the inlet end and the heel portion. The transition segment has a junction end. The transition segment is disposed along a main flow discharge axis extending between the heel portion and the junction end. The junction end defines first and second junction openings. The first junction opening is disposed in spaced relationship to the second junction opening. The heel portion has a surface adapted to direct a flow of slurry moving from the inlet opening along the main flow entry axis through the heel portion to the transition segment along the main flow discharge axis. The inlet conduit defines an inlet passage extending between the inlet opening and the first and second junction openings.

The first outlet conduit is in fluid communication with the first junction opening of the inlet conduit. The first outlet conduit includes a discharge end defining a first discharge opening. The second outlet conduit is in fluid communication with the second junction opening of the inlet conduit. The second outlet conduit includes a discharge end defining a second discharge opening.

The junction portion is disposed at the junction end of the inlet conduit. The junction portion is disposed between the first junction opening and the second junction opening. The inlet conduit includes a contoured portion that defines a flow restriction in the inlet passage adjacent the junction portion.

In another aspect of the present disclosure, embodiments of a slurry mixing and dispensing assembly are described. In one embodiment, a slurry mixing and dispensing assembly includes a mixer and a multi-leg discharge boot.

The mixer is adapted to agitate water and a cementitious material to form an aqueous cementitious slurry. The multi-leg discharge boot is in fluid communication with the mixer.

The multi-leg discharge boot includes an inlet conduit and first and second outlet conduits separated by a junction portion. The inlet conduit includes an entry segment, a transition segment and a heel portion disposed therebetween.

The entry segment has an inlet end defining an inlet opening. The entry segment is disposed along a main flow entry axis extending between the inlet end and the heel portion. The transition segment has a junction end. The transition segment is disposed along a main flow discharge axis extending between the heel portion and the junction end. The junction end defines first and second junction openings. The first junction opening is disposed in spaced relationship to the second junction opening. The heel portion has a surface adapted to direct a flow of slurry moving from the inlet opening along the main flow entry axis through the heel portion to the transition segment along the main flow discharge axis.

The first outlet conduit is in fluid communication with the first junction opening of the inlet conduit. The first outlet conduit includes a discharge end defining a first discharge opening. The second outlet conduit is in fluid communication with the second junction opening of the inlet conduit. The second outlet conduit includes a discharge end defining a second discharge opening.

The junction portion is disposed at the junction end of the inlet conduit. The junction portion is disposed between the first junction opening and the second junction opening. The junction portion includes a substantially planar wall region. The wall region is substantially perpendicular to the main flow discharge axis.

In another embodiment, a cementitious slurry mixing and dispensing assembly includes a mixer and a multi-leg discharge boot. The mixer is adapted to agitate water and a cementitious material to form an aqueous cementitious slurry. The multi-leg discharge boot is in fluid communication with the mixer.

The multi-leg discharge boot includes an inlet conduit and first and second outlet conduits separated by a junction portion. The inlet conduit includes an entry segment, a transition segment and a heel portion disposed therebetween.

The entry segment has an inlet end defining an inlet opening. The entry segment is disposed along a main flow entry axis extending between the inlet end and the heel portion. The transition segment has a junction end. The transition segment is disposed along a main flow discharge axis extending between the heel portion and the junction end. The junction end defines first and second junction openings. The first junction opening is disposed in spaced relationship to the second junction opening. The heel portion has a surface adapted to direct a flow of slurry moving from the inlet opening along the main flow entry axis through the heel portion to the transition segment along the main flow discharge axis. The inlet conduit defines an inlet passage extending between the inlet opening and the first and second junction openings.

The first outlet conduit is in fluid communication with the first junction opening of the inlet conduit. The first outlet conduit includes a discharge end defining a first discharge opening. The second outlet conduit is in fluid communication with the second junction opening of the inlet conduit. The second outlet conduit includes a discharge end defining a second discharge opening.

The junction portion is disposed at the junction end of the inlet conduit. The junction portion is disposed between the first junction opening and the second junction opening. The inlet conduit includes a contoured portion that defines a flow restriction in the inlet passage adjacent the junction portion.

In another aspect of the present disclosure, embodiments of a method of preparing a cementitious product are described. In one embodiment of a method of preparing cementitious product, a main flow of aqueous cementitious slurry is discharged from a mixer. The main flow of aqueous cementitious slurry is redirected in an inlet conduit of a multi-leg discharge boot from a main flow entry axis to a main flow discharge axis by a change in direction angle within a range of about ten degrees to about one hundred thirty-five degrees. The main flow of aqueous cementitious slurry is moved past a flow restriction in the inlet conduit upstream of a junction portion separating first and second outlet conduits of the multi-leg discharge boot. The main flow of aqueous cementitious slurry moving along the main flow discharge axis is split into a first discharge flow of aqueous slurry and a second discharge flow of aqueous slurry in the multi-leg discharge boot. The first and second discharge flows are discharged from the first and second outlet conduits.

Further and alternative aspects and features of the disclosed principles will be appreciated from the following detailed description and the accompanying drawings. As will be appreciated, the multi-leg discharge boots disclosed herein are capable of being carried out and used in other and different embodiments, and capable of being modified in various respects. Accordingly, it is to be understood that both the foregoing general description and the following detailed description are exemplary and explanatory only and do not restrict the scope of the appended claims.

BRIEF DESCRIPTION OF THE DRAWINGS

FIG. 3 is an outlet end elevational view of the multi-leg discharge boot of FIG. 1.

FIG. 4 is a top plan view of the multi-leg discharge boot of FIG. 1.

FIG. 5 is a side elevational view of the multi-leg discharge boot of FIG. 1.

DETAILED DESCRIPTION OF EXEMPLARY EMBODIMENTS

Figure 1:
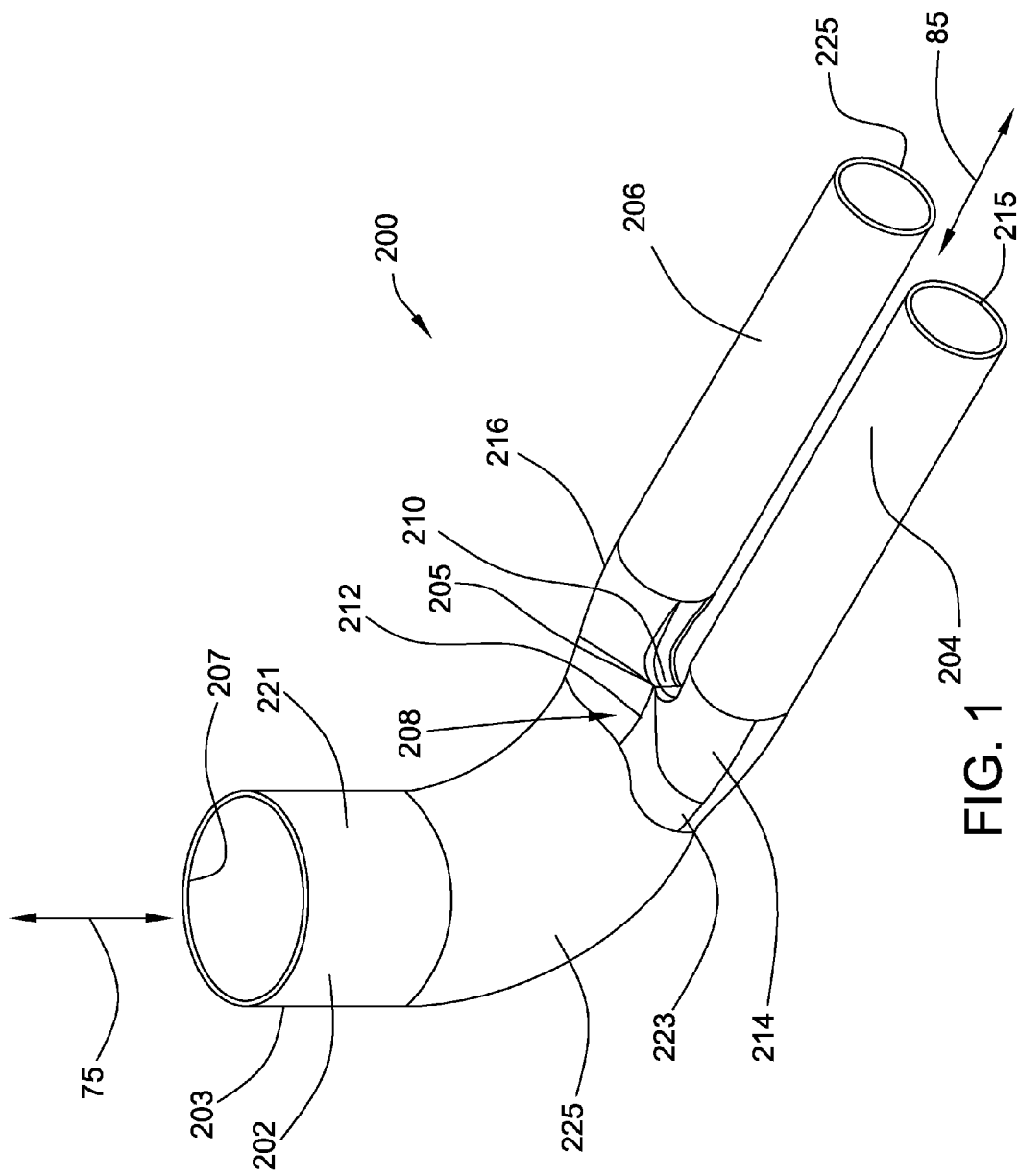
FIG. 1 is a perspective view of an embodiment of a multi-leg discharge boot constructed in accordance with principles of the present disclosure and suitable for use in a cementitious slurry mixing and dispensing assembly.

The present disclosure provides various embodiments of a cementitious slurry mixing and dispensing assembly that can be used in the manufacture of products, including cementitious products such as gypsum wallboard, for example. Embodiments of a cementitious slurry mixing and dispensing assembly constructed in accordance with principles of the present disclosure can be used in a manufacturing process that includes a multi-leg discharge boot in a discharge conduit mounted to a mixer to effectively split a single flow of a slurry—such as an aqueous foamed gypsum slurry containing air and liquid phases, for example—entering the multi-leg discharge boot from the mixer such that at least two independent flows of the slurry exit from the multi-leg discharge boot.

Embodiments of a cementitious slurry mixing and dispensing assembly constructed in accordance with principles of the present disclosure can be used to mix and distribute a cementitious slurry (e.g., an aqueous calcined gypsum slurry) onto an advancing web (e.g., paper or mat) moving on a conveyor during a continuous board (e.g., wallboard) manufacturing process. In one aspect, a multi-leg discharge boot constructed in accordance with principles of the present disclosure can be used in a conventional gypsum drywall manufacturing process as, or as a part of, a discharge conduit attached to a mixer adapted to agitate calcined gypsum and water to form an aqueous calcined gypsum slurry.

A cementitious slurry mixing and dispensing assembly according to principles of the present disclosure can be used to form any type of cementitious product, such as a board, for example. In some embodiments, a cementitious board, such as a gypsum drywall, a Portland cement board or an acoustical panel, for example, can be formed.

The cementitious slurry can be any conventional cementitious slurry, for example any cementitious slurry commonly used to produce gypsum wallboard, acoustical panels including, for example, acoustical panels described in U.S. Patent Application Publication No. 2004/0231916, or Portland cement board. As such, the cementitious slurry can optionally further comprise any additives commonly used to produce cementitious board products. Such additives include structural additives including mineral wool, continuous or chopped glass fibers (also referred to as fiberglass), perlite, clay, vermiculite, calcium carbonate, polyester, and paper fiber, as well as chemical additives such as foaming agents, fillers, accelerators, sugar, enhancing agents such as phosphates, phosphonates, borates and the like, retarders, binders (e.g., starch and latex), colorants, fungicides, biocides, hydrophobic agent, such as a silicone-based material (e.g., a silane, siloxane, or silicone-resin matrix), and the like. Examples of the use of some of these and other additives are described, for instance, in U.S. Pat. Nos. 6,342,284; 6,632,550; 6,800,131; 5,643,510; 5,714,001; and 6,774,146; and U.S. Patent Application Publication Nos. 2004/0231916; 2002/0045074; 2005/0019618; 2006/0035112; and 2007/0022913.

Non-limiting examples of cementitious materials include Portland cement, sorrel cement, slag cement, fly ash cement, calcium alumina cement, water-soluble calcium sulfate anhydrite, calcium sulfate α-hemihydrate, calcium sulfate β-hemihydrate, natural, synthetic or chemically modified calcium sulfate hemihydrate, calcium sulfate dihydrate ("gypsum," "set gypsum," or "hydrated gypsum"), and mixtures thereof. In one aspect, the cementitious material desirably comprises calcined gypsum, such as in the form of calcium sulfate alpha hemihydrate, calcium sulfate beta hemihydrate, and/or calcium sulfate anhydrite. In embodiments, the calcined gypsum can be fibrous in some embodiments and nonfibrous in others. The calcined gypsum can include at least about 50% beta calcium sulfate hemihydrate. In other embodiments, the calcined gypsum can include at least about 86% beta calcium sulfate hemihydrate. The weight ratio of water to calcined gypsum can be any suitable ratio, although, as one of ordinary skill in the art will appreciate, lower ratios can be more efficient because less excess water must be driven off during manufacture, thereby conserving energy. In some embodiments, the cementitious slurry can be prepared by combining water and calcined gypsum in a range from about a 1:6 ratio by weight respectively to about 1:1 ratio, such as about 2:3, for board production depending on products.

Figure 11:
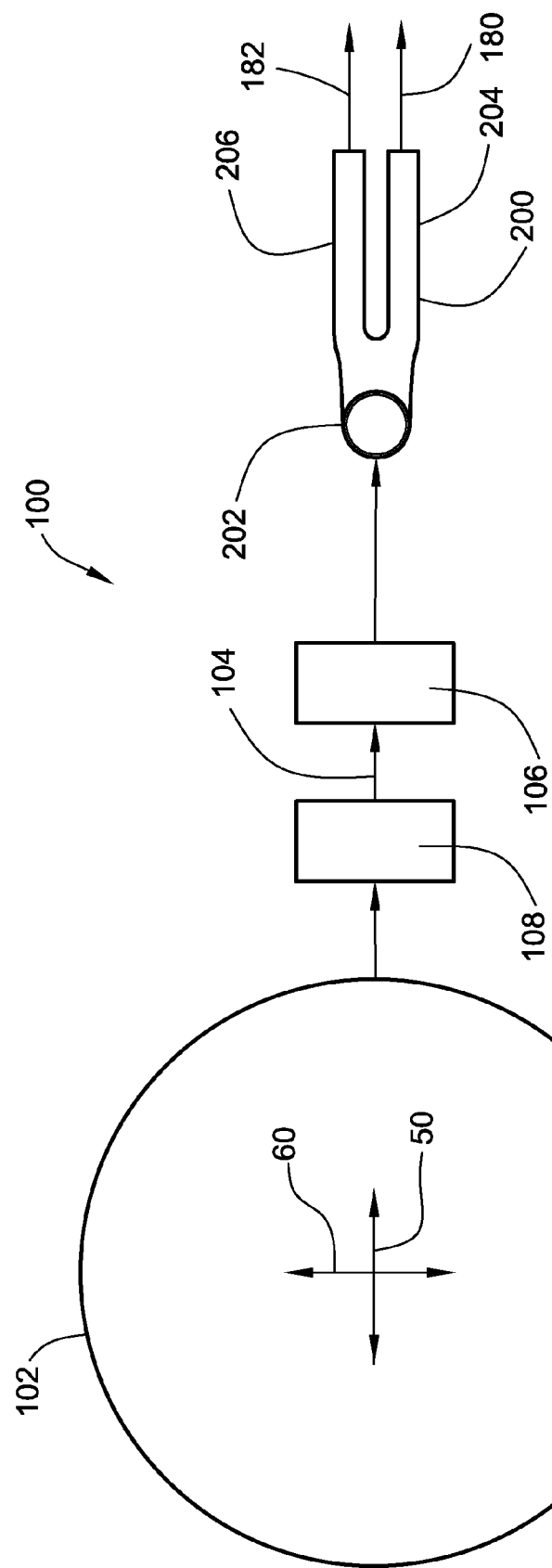
FIG. 11 is a schematic plan diagram of an embodiment of a cementitious slurry mixing and dispensing assembly including a multi-leg discharge boot constructed in accordance with principles of the present disclosure.
Figure 12:
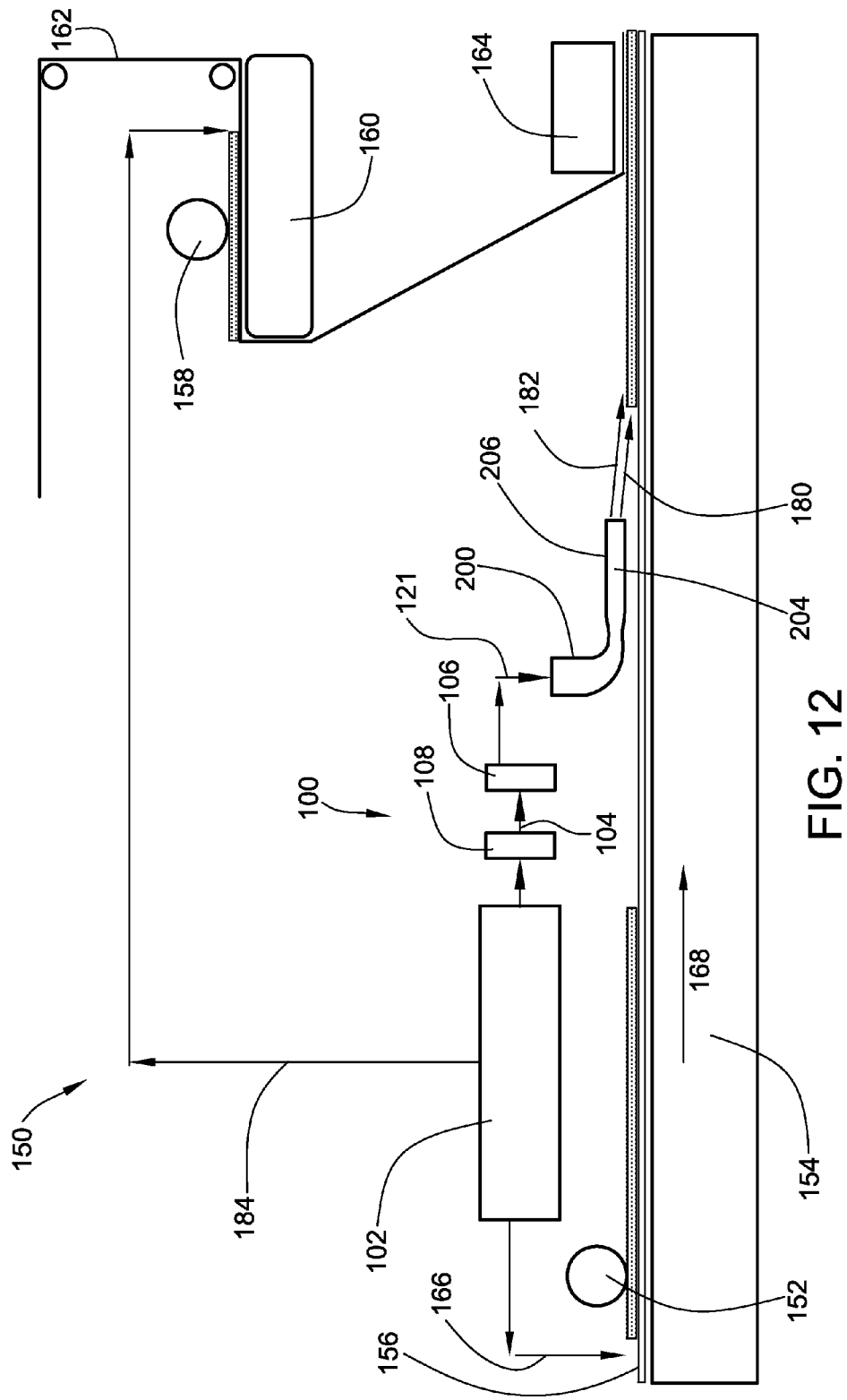
FIG. 12 is a schematic elevational diagram of an embodiment of a wet end of a gypsum wallboard manufacturing line including an embodiments of a multi-leg boot constructed in accordance with principles of the present disclosure.

Turning now to the Figures, Referring to FIGS. 1-7, an embodiment of the multi-leg discharge boot 200, which is constructed according to principles of the present disclosure, is shown. An embodiment of a multi-leg discharge boot constructed in accordance with principles of the present disclosure can advantageously be configured as a retrofit component in an existing wallboard manufacturing system, for example. The multi-leg discharge boot 200 can be placed in fluid communication with a slurry mixer 102, for example, as shown in FIGS. 11 and 12, to deliver separated flows of slurry therefrom. In embodiments, the multi-leg discharge boot comprises a terminal portion of a discharge conduit in fluid communication with the mixer.

The multi-leg discharge boot 200 can be made from any suitable material, such as a flexible material, including poly vinyl chloride (PVC), urethane, or any other suitable resiliently flexible material. In other embodiments, the multi-leg discharge boot 200 can be made from other materials, such as a substantially rigid material (e.g., aluminum, stainless steel, etc.).

The multi-leg discharge boot 200 includes an inlet conduit 202 and first and second outlet conduits 204, 206 separated by a junction portion 210. The inlet conduit 202 can be adapted to receive a main flow of slurry from a mixer. The pair of outlet conduits 204, 206 are substantially cylindrical in the illustrated embodiment and each are in fluid communication with the inlet conduit 202. The outlet conduits 204, 206 can be adapted to dispense two separate outlet flows of slurry from the multi-leg discharge boot 200.

Although the illustrated embodiment of the discharge boot 200 includes two outlet conduits or "legs" 204, 206, it should be understood that in other embodiments, a discharge boot according to principles of the present disclosure can have more than two outlet conduits. In embodiments including more than two legs, a junction and/or a contoured portion as described herein can be provided between each pair of adjacent legs.

Referring to FIG. 1, the inlet conduit 202 includes an entry segment 221, a transition segment 223, and a heel portion 225 disposed therebetween. The entry segment 221 has an inlet end 203 defining an inlet opening 207. The entry segment 221 is disposed along a main flow entry axis 75 extending between the inlet end 203 and the heel portion 225 (see FIG. 5 also). The inlet opening 207 of the inlet end 203 can be adapted to be placed in fluid communication with a slurry mixer and to receive a main flow of slurry therefrom.

The transition segment 223 has a junction end 205. The transition segment 223 is disposed along a main flow discharge axis 85 extending between the heel portion 225 and the junction end 205 (see FIG. 5 also).

Referring to FIG. 5, the entry segment 221 is disposed at a feed angle θ with respect to the transition segment 223 and the first and second outlet conduits 204, 206. The feed angle θ can be in a range from about forty five degrees to about one hundred seventy degrees in some embodiments, from about sixty degrees to one hundred twenty degrees in other embodiments, and from about seventy degrees to about one hundred ten degrees in yet other embodiments. The illustrated entry segment 221 is substantially perpendicular to the transition segment 223 and to the first and second outlet conduits 204, 206.

Figure 6:
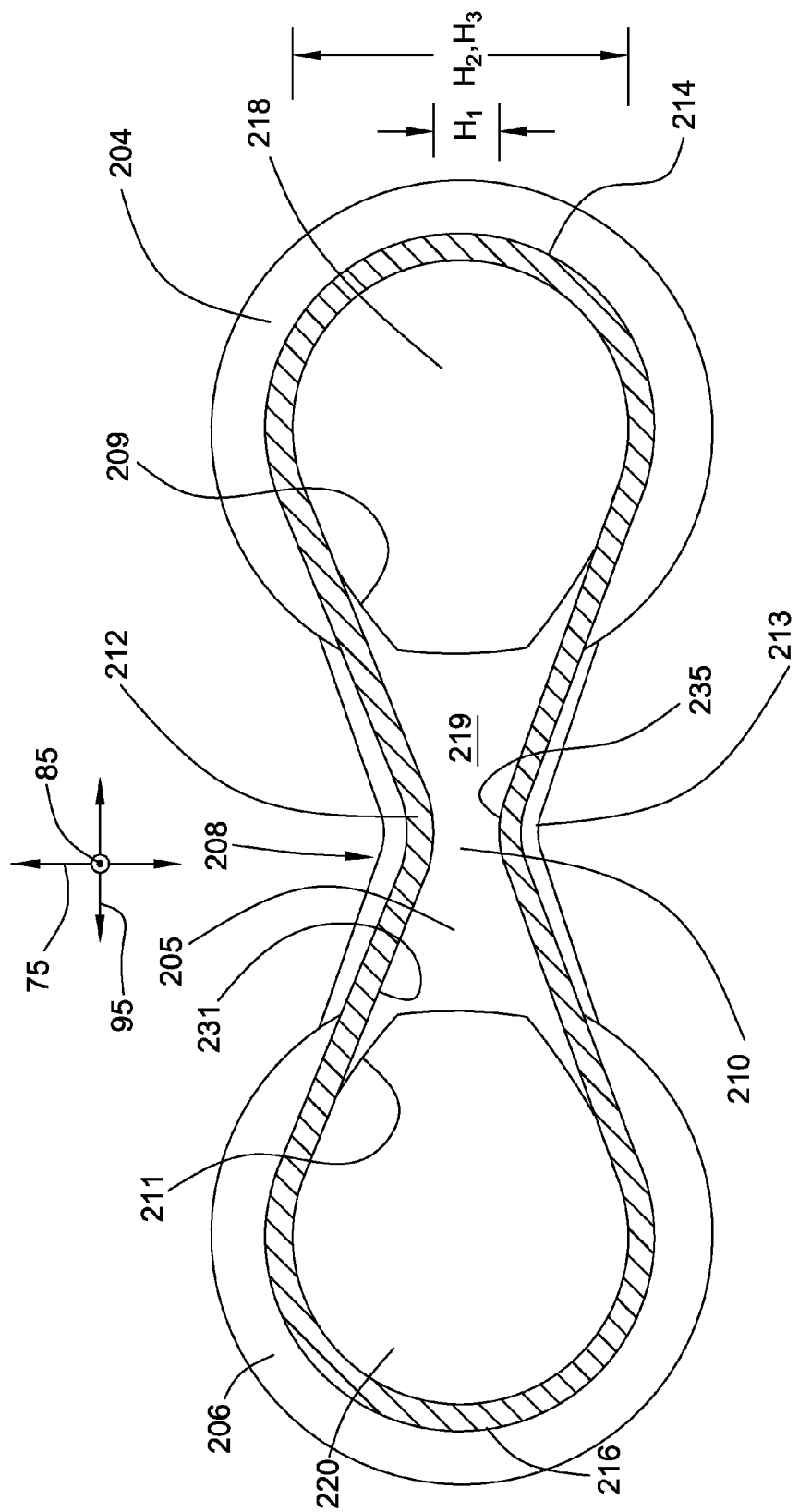
FIG. 6 is a cross-sectional view of the multi-leg discharge boot of FIG. 1 taken along line VI-VI in FIG. 4.

Referring to FIG. 6, the junction end 205 defines first and second junction openings 209, 211. The first junction opening 209 is disposed in spaced relationship to the second junction opening 211. The first and second junction openings 209, 211 are adapted to split the main flow of aqueous cementitious slurry into a first discharge flow of aqueous slurry and a second discharge flow of aqueous slurry.

Figure 7:
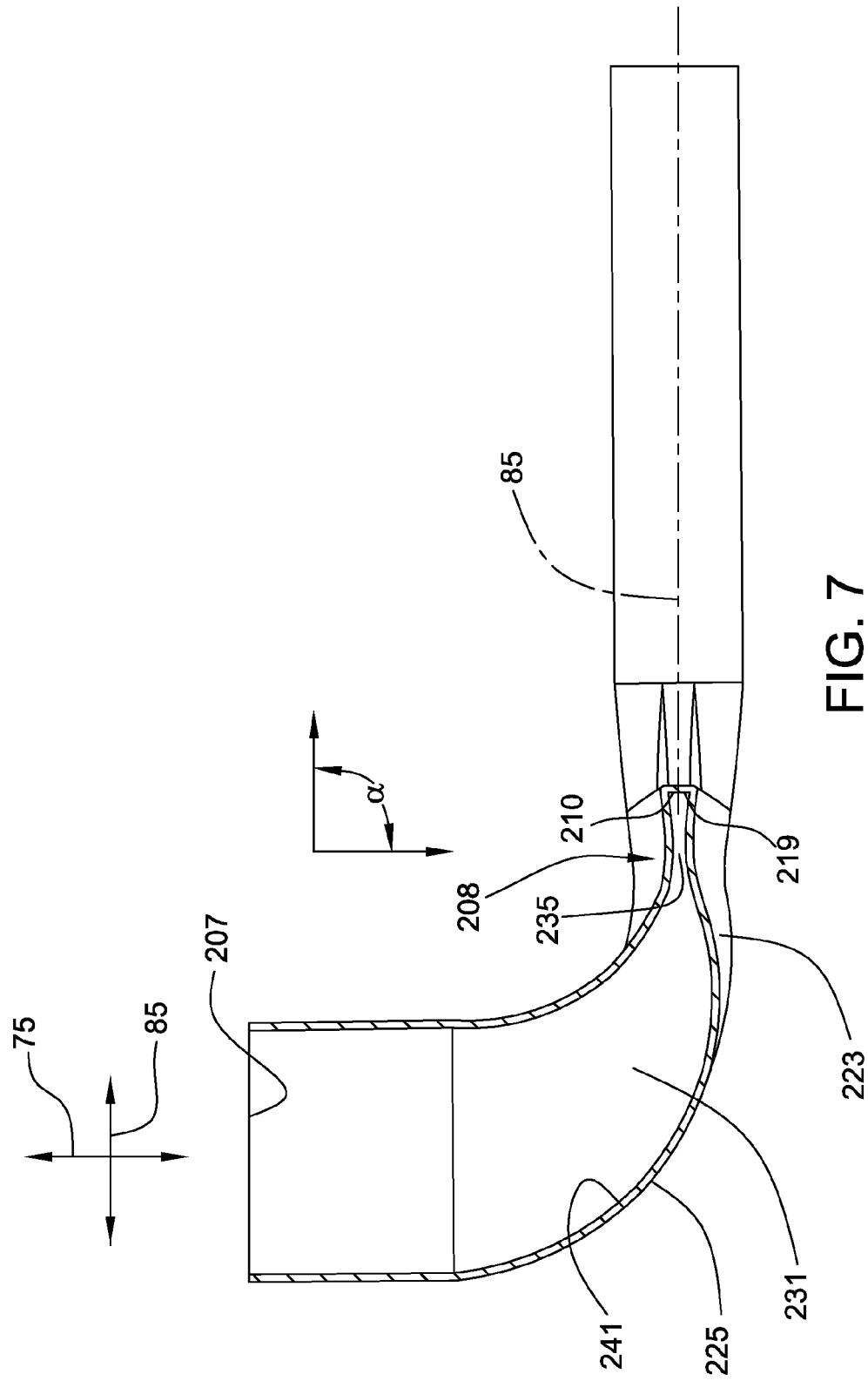
FIG. 7 is a cross-sectional view of the multi-leg discharge boot of FIG. 1 taken along line VII-VII in FIG. 4.

Referring to FIG. 7, the heel portion 225 has a surface 241 adapted to direct a flow of slurry moving from the inlet opening 207 along the main flow entry axis 75 through the heel portion 225 to the transition segment 223 along the main flow discharge axis 85. The heel portion 225 can be adapted to redirect the main flow of slurry from the main flow entry axis 75 to the main flow discharge axis 85 by a change in direction angle α. In some embodiments, the change in direction angle α can be in a range of about ten degrees to about one hundred thirty-five degrees, from about sixty degrees to one hundred twenty degrees in other embodiments, and from about seventy degrees to about one hundred ten degrees in yet other embodiments.

Referring to FIG. 3, the first outlet conduit 204 is in fluid communication with the first junction opening 209 of the inlet conduit 202. The first outlet conduit 204 includes a discharge end 215 defining a first discharge opening 217. The first outlet conduit 204 is adapted to receive the first discharge flow of aqueous slurry from the inlet conduit 202 and to dispense the first discharge flow from the first discharge opening 217.

The second outlet conduit 206 is in fluid communication with the second junction opening 211 of the inlet conduit 202. The second outlet conduit 206 includes a discharge end 225 defining a second discharge opening 227. The second outlet conduit 206 is adapted to receive the second discharge flow of aqueous slurry from the inlet conduit 202 and to dispense the second discharge flow from the second discharge end 225.

Figure 2:
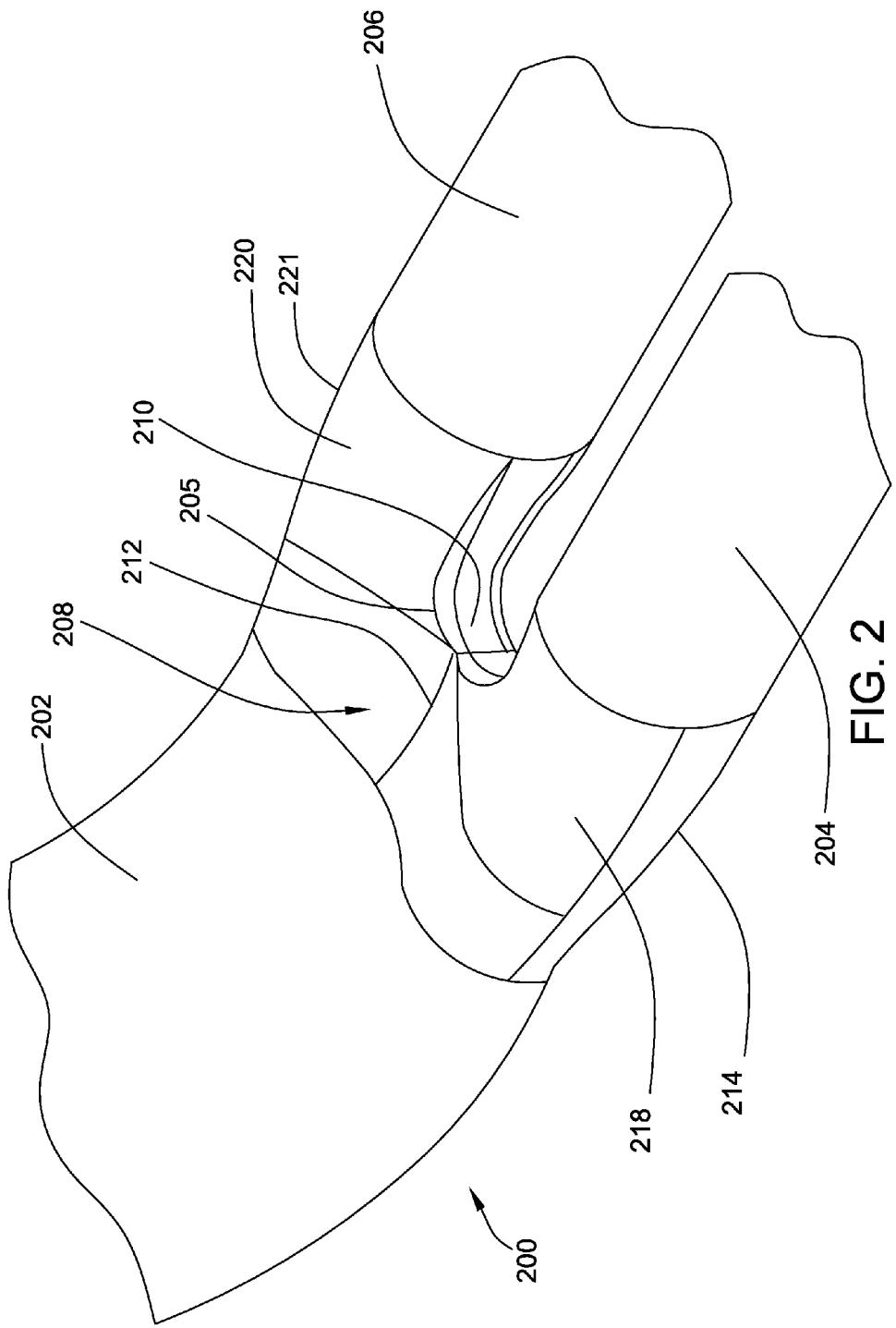
FIG. 2 is an enlarged, fragmentary perspective view of a portion of the multi-leg discharge boot of FIG. 1.

Referring to FIGS. 1 and 2, the junction portion 210 is disposed at the junction end 205 of the inlet conduit 202. Referring to FIG. 6, the junction portion 210 is disposed between the first junction opening 209 and the second junction opening 211. The junction portion 210 includes a substantially planar wall region 219 (see FIG. 7 also). Referring to FIG. 7, the wall region 219 is substantially perpendicular to the main flow discharge axis 85.

Referring to FIGS. 3 and 4, the first discharge opening 217 of the first outlet conduit 204 and the second discharge opening 227 of the second outlet conduit 206 each can have a cross-sectional area less than or about equal to the cross-section area of the inlet opening 207 of the inlet conduit 202. In embodiments, the cross-sectional area of the first discharge opening 217 of the first outlet conduit 204 and the cross-sectional area of the second discharge opening 227 of the second outlet conduit 206 each is less than about 85% of the cross-section area of the inlet opening 207 of the inlet conduit 202. In some embodiments, the cross-sectional area of the first discharge opening 217 of the first outlet conduit 204 is substantially the same as the cross-sectional area of the second discharge opening 227 of the second outlet conduit 206.

In the illustrated embodiment, the inside diameter $Ø_1$ of the inlet opening 207 of the inlet conduit 202 is larger than the inside diameters $Ø_2$, $Ø_3$ of the first discharge opening 217 of the first outlet conduit 204 and the second discharge opening 227 of the second outlet conduit 206, respectively. In the illustrated embodiment, the respective inside diameters $Ø_2$, $Ø_3$ of the first discharge opening 217 of the first outlet conduit 204 and the second discharge opening 227 of the second outlet conduit 206 are substantially the same.

The inside diameters $Ø_1$, $Ø_2$, $Ø_3$ (and, thus, the cross-sectional areas) of the inlet opening 207 and the first and second discharge openings 217, 227 can vary depending on the desired average flow velocity. Higher average flow velocity can reduce the chance of set material buildup resulting from solidification of slurry residing in the discharge boot 200. The inside diameter $\emptyset_2$, $\emptyset_3$ of the first and second discharge openings 217, 227 can be made smaller than the inside diameter $\emptyset_1$ of the inlet opening 207 in order to maintain a relatively high flow velocity throughout the multi-leg discharge boot 200. When the inside diameters $\emptyset_2$, $\emptyset_3$ of the first and second discharge openings 217, 227 are substantially equal to the inside diameter $\emptyset_1$ of the inlet opening 207, the average flow velocity of the slurry will be reduced by about 50% through the outlet conduits 204, 206 if the volumetric flow rate through the inlet and both outlets is substantially the same. When the inside diameters of the outlet conduits 204, 206 are smaller than the inside diameter of the inlet conduit, however, the flow velocity can be maintained in the outlet conduits 204, 206 or at least reduced to a lesser extent than if the discharge conduits 204, 206 and the inlet conduit 202 have substantially equal inside diameters $\emptyset_1$, $\emptyset_2$, $\emptyset_3$.

The multi-leg discharge boot 200 also includes a central contoured portion 208. Referring to FIGS. 6 and 7, the inlet conduit 202 defines an inlet passage 231 extending between the inlet opening 207 and the first and second junction openings 209, 211. The inlet conduit 202 includes the contoured portion 208 which defines a flow restriction 235 in the inlet passage 231 adjacent the junction portion 210.

The contoured portion 208 includes an upper convex region 212 and an opposing lower convex region 213. The upper and lower convex regions 212, 213 project toward each other in the inlet passage 231 to define the flow restriction 235 therebetween.

Referring to FIG. 6, the contoured portion 208 defines first and second guide channels 218, 220. The flow restriction 235 is disposed laterally between the first and second guide channels 218, 220 along a transverse axis 95 substantially perpendicular to the main flow discharge axis 85. The first and second guide channels 218, 220 are disposed laterally outwardly relative to the upper and lower convex regions 212, 213, respectively. The first and second guide channels 218, 220 each have a cross-sectional area greater than the cross-sectional area of the flow restriction 235. The first and second guide channels 218, 220 are substantially aligned with the first and second junction openings 209, 211, respectively.

The flow restriction 235 has a maximum height $H_1$ along a height axis which coincides with the main flow entry axis 75 in this embodiment. The height axis 75 is perpendicular to both the main flow discharge axis 85 and the transverse axis 95. The first and second guide channels 218, 220 each have a maximum height $H_2$, $H_3$ along the height axis 75 which is larger than the maximum height $H_1$ of the flow restriction 235. In the illustrated embodiment, the first and second guide channels 218, 220 have substantially the same maximum height $H_2$, $H_3$ along the height axis 75.

The contour portion 208 includes the upper depression 212 in the top of the multi-leg discharge boot 200 and the lower depression 213 in the bottom of the multi-leg discharge boot 200 that helps promote flow to outer lateral edges 214, 216 of the multi-leg discharge boot to reduce the occurrence of slurry buildup at the junction 210. As shown in the Figures, the shape of the central contoured portion 208 results in large channels 218, 220 disposed adjacent respective outer edges 214, 216 thereof. The depressions 212, 213 in the central portion 208 define the flow restriction 235 which has a smaller cross-sectional area than the cross-sectional area at the outer edges 214, 216 and a smaller height $H_2$, $H_3$ than found adjacent the outer edges $H_2$, $H_3$. As a result, the slurry flowing along the main flow discharge axis 85 toward the junction 210 encounters less flow resistance in the guide channels 218, 220 disposed at the outer edges 214, 216. Therefore, flow is directed toward the large channels 218, 220 at the multi-leg discharge boot's 200 outer edges 214, 216 and away from the central portion 208 and the junction 210.

The junction 210 is disposed between the two outlet conduits 204, 206. The junction 210 is made up of the planar wall 219 that is substantially perpendicular to the main flow discharge axis 85 along which slurry will flow when entering the inlet opening 207 of the inlet conduit 202. The planar wall 219 is sized such that fibers and other additives in the cementitious slurry are impeded from wrapping around the junction 210 and building up at that site (a process also referred to as "stapling"). The planar wall 219 can be configured to help prevent slurry from adhering to the junction 210, building up, and eventually breaking off to cause lump formation. Depending on the line speed and volumes passing through the multi-leg discharge boot 200 and the boot legs 204, 206, the configuration of the junction 210 and the central contoured portion 208 can be varied to achieve the desired results.

The junction 210 can be configured to help prevent slurry buildup in a region just upstream of the junction 210. If this buildup does occur, however, it can disrupt the flow of slurry, which can cause the split of slurry flow to become uneven and/or interrupted. The trapped buildup of slurry can harden and set, that in time can eventually break away, causing hard lumps to be carried in the slurry flow which can cause process problems and interruptions, such as paper breaks at the forming station.

Figure 8:
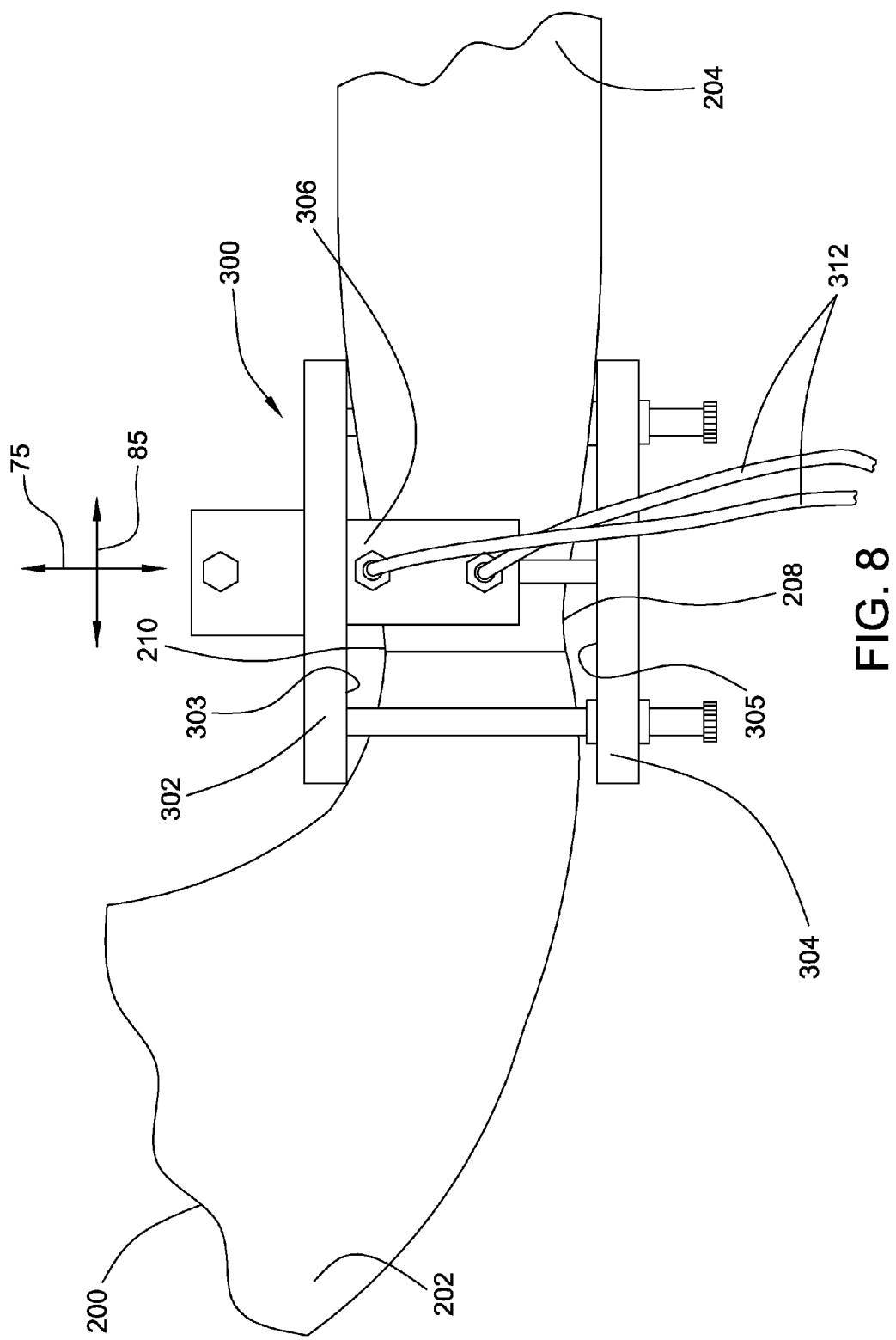
FIG. 8 is a side elevational view of the multi-leg discharge boot of FIG. 1 disposed within an embodiment of a compressing device constructed in accordance with principles of the present disclosure.
Figure 9:
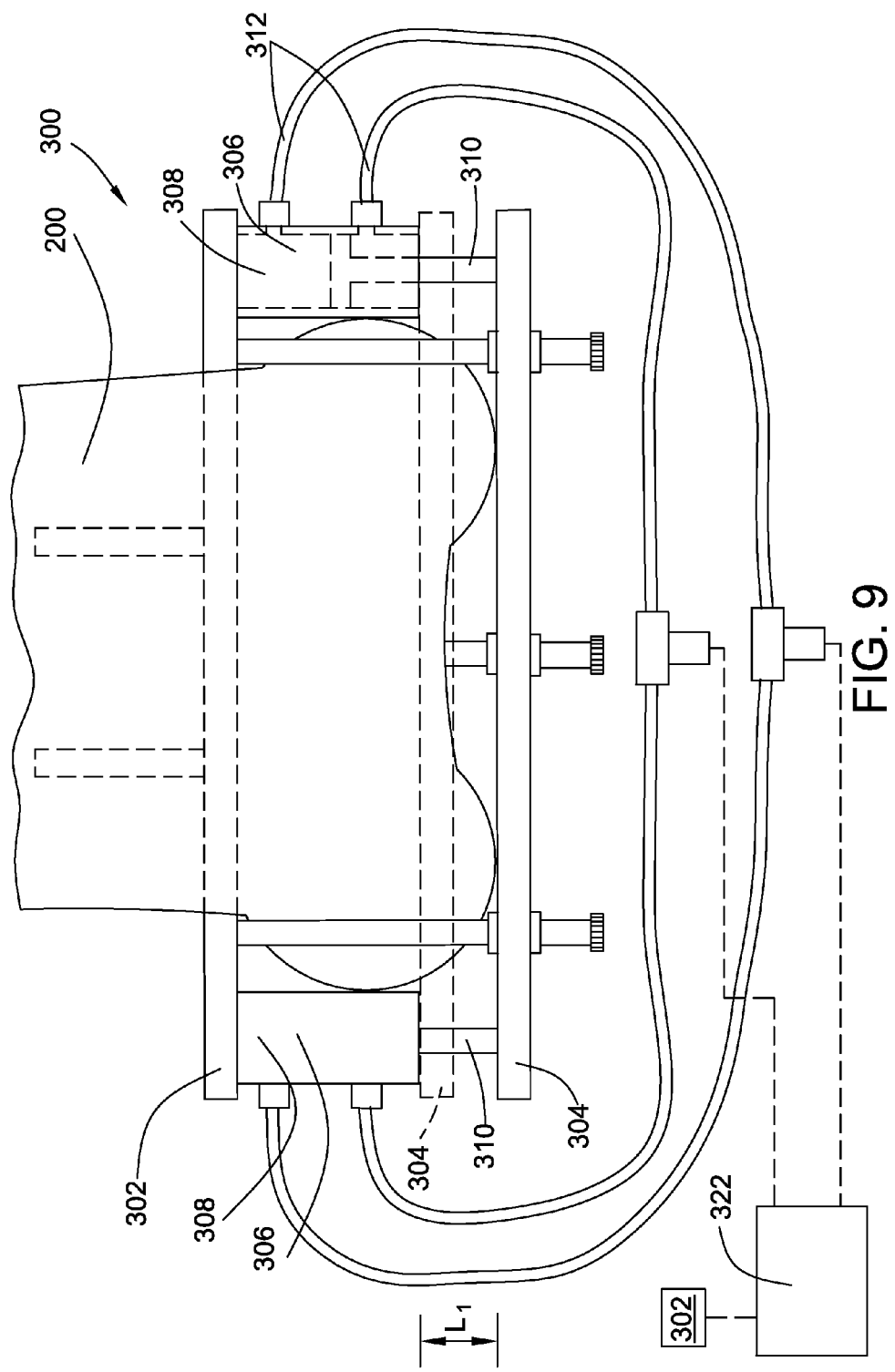
FIG. 9 is an inlet end elevational view of the multi-leg discharge boot of FIG. 1 and the compressing device of FIG. 8.
Figure 10:
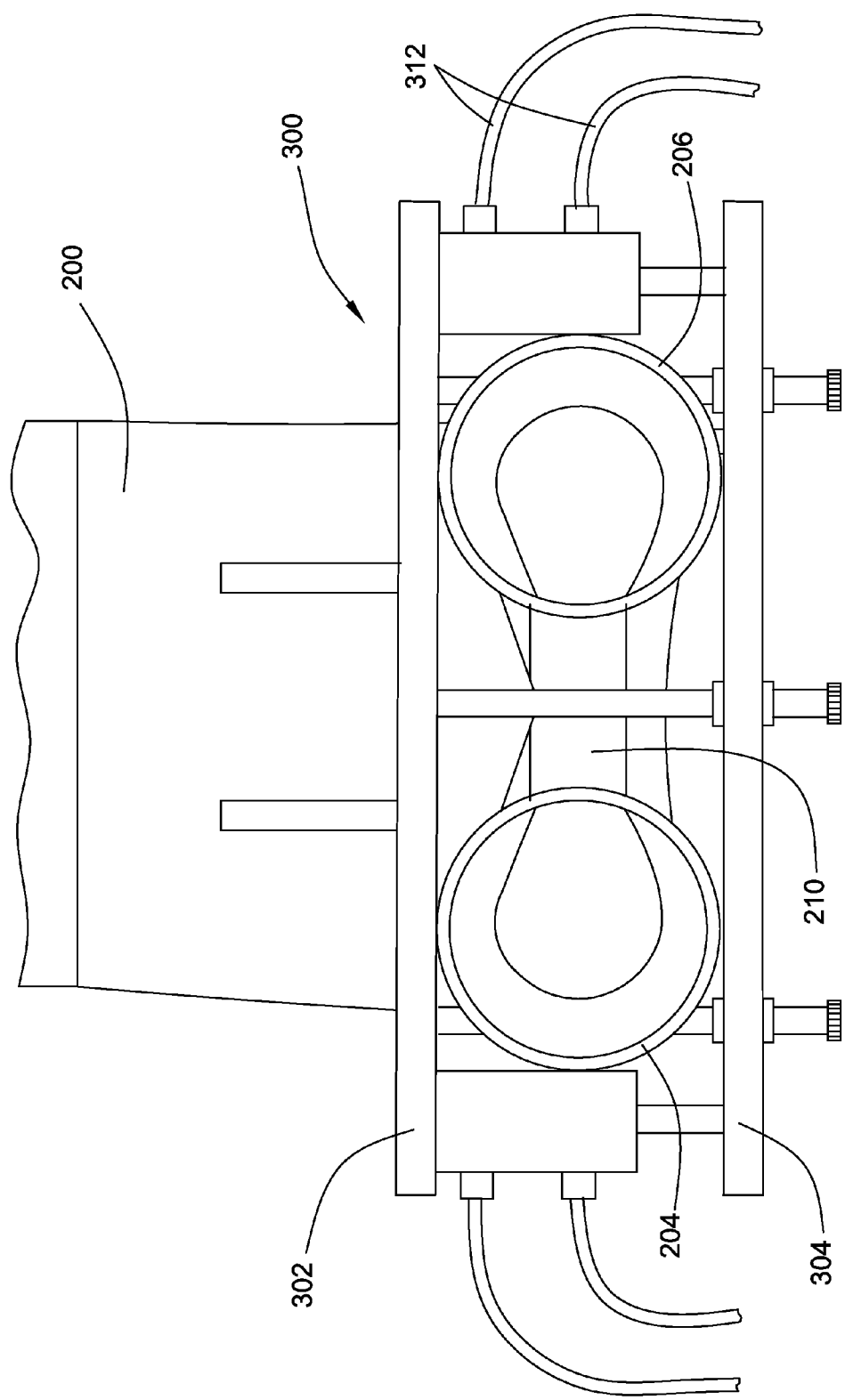
FIG. 10 is an outlet end elevational view of the multi-leg discharge boot of FIG. 3 and the compressing device of FIG. 8.

Referring to FIGS. 8-10, an embodiment of a compressing device or automatic squeezing apparatus 300 for compressing the multi-leg discharge boot 200 at adjustable and regular time intervals can be provided to help prevent slurry from building up inside the multi-leg discharge boot. The squeezing apparatus 300 addresses potential cleanliness issues associated with the multi-leg discharge boot 200 as it splits a main flow of incoming cementitious slurry into two outlet flow streams. The squeezing apparatus 300 squeezes a central portion 208 of the multi-leg discharge boot 200 to help reduce buildup of set slurry at the junction 210.

The compressing device 300 includes first and second compressing members 302, 304 disposed in spaced relationship to each other. The junction portion 210 of the multi-leg discharge boot 200 is disposed between the first and second compressing members 302, 304. At least one of the first and second compressing members 302, 304 is movable over a range of travel relative to the other compressing member 304 along a compressing axis 75, which is substantially perpendicular to the main flow discharge axis 85, between a normal position and a compressed position (see second compressing member 304 shown in phantom in FIG. 9). In the compressed position, a portion of at least one of the inlet conduit 202 and the first and second outlet conduits 204, 206 adjacent the junction portion 210 is compressed relative to the normal position. In embodiments, the junction portion 210 is compressed when the compressing members 302, 304 are in the compressed position relative to the normal position.

The compressing members 302, 304 each comprise a substantially planar compressing surface 303, 305. The compressing surfaces 303, 305 are in substantially parallel relationship to each other and to the main flow discharge axis 75.

Referring to FIG. 9, the compressing device 300 includes at least one actuator 306 adapted to selectively move the first compressing member 302 relative to the second compressing member 304. In the illustrated embodiment, the second compressing member 304, which is disposed below the multi-leg discharge boot 200, is movable, and the first compressing member 302 is stationary. In other embodiments, other movement arrangements are possible.

The compressing device 300 can include a controller 320 adapted to control each actuator 306 such that the actuator 306 is periodically actuated according to a predetermined frequency to periodically compress the junction portion. The controller 320 can be adapted to control each actuator 306 such that the actuator 306 is actuated to move the first and second compressing members 302, 304 toward each other by a predetermined stroke length $L_1$ (see FIG. 10).

As shown in FIGS. 8-10, the squeezing apparatus 300 is disposed adjacent the junction 210 of the multi-leg discharge boot 200. The first and second compressing members are in the form of an upper plate 302 and a lower plate 304. The upper plate 302 is positioned on the top of the multi-leg discharge boot 200, and the lower plate 304 is positioned below the multi-leg discharge boot 200. As best shown in FIG. 9, the illustrated squeezing apparatus 300 includes a pair of actuators 306 in the form of a pneumatic cylinder 308 with a reciprocally movable piston 310. Each actuator 306 is mounted to the upper plate 302 and the lower plate 304 such that, when the actuator is actuated, the piston 310 retracts and the lower plate 304 moves toward the upper plate 302 over a defined stroke length $L_1$ along the height axis 75 which is substantially perpendicular to the main flow discharge axis 75. A pair of pneumatic lines 312 is connected to the pneumatic chamber 308 of each actuator 306 and to a source of pressurized air 322. The controller 320 is adapted to selectively control the source of pressurized air 322, such as with suitable electrically-operated valves, for example, to selectively operate the actuators 306 to retract the pistons 310 to compress the squeezing apparatus and to extend the pistons to return the plates 302, 304 to the normal position. The actuator 306 can be operated either automatically or selectively to move the plates 302, 304 together relative to each other to apply a compressive force upon the multi-leg discharge boot 200 at the recessed central portion 208 and the junction 210. Moving the upper and lower plates 302, 304 closer to each other applies a compressive force that can cause the multi-leg discharge boot 200 to flex inwardly at the junction 210 to discourage slurry build up.

When the squeezing apparatus 300 squeezes the multi-leg discharge boot 200, the squeezing action applies compressive force to the multi-leg discharge boot, which flexes inwardly in response. This force helps prevent buildup of solids that can disrupt the flow of slurry through the outlet conduits 204, 206 of the multi-leg discharge boot 200. In some embodiments, the squeezing apparatus 300 is designed to automatically pulse through the use of a programmable controller operably arranged with the actuators 306. The squeezing apparatus 300 can be configured such that it actuates at varying stroke lengths and frequencies, which can be adjusted depending on production conditions. The squeezing apparatus 300 can also provide support for the multi-leg discharge boot 200 to help maintain the internal geometry of the multi-leg discharge boot and help prevent unwanted distortion, which can help maintain proper velocity and flow characteristics when slurry flows through the multi-leg discharge boot 200.

Referring to FIGS. 11 and 12, an embodiment of a slurry mixing and dispensing assembly 100 is shown that includes a slurry mixer 102 in fluid communication with a multi-leg discharge boot 200 constructed in accordance with principles of the present disclosure. The slurry mixer 102 can be adapted to agitate water and a cementitious material to form an aqueous cementitious slurry. Both the water and the cementitious material can be supplied to the mixer 102 via one or more inlets as is known in the art. Any suitable mixer (e.g., a pin mixer) can be used with the slurry mixing and dispensing assembly 100.

The multi-leg discharge boot 200 illustrated in FIG. 11 is adapted to separate an incoming main flow of slurry from the slurry mixer 102 into two substantially even discharge flows. The multi-leg discharge boot 200 has an inlet conduit 202 adapted to receive the main flow of slurry from the mixer 102 and a pair of outlet conduits 204, 206 each in fluid communication with the inlet conduit 202 and adapted to dispense two outlet flows of slurry from the multi-leg discharge boot 200.

A discharge conduit 104 is in fluid communication with the slurry mixer 102 and comprises the multi-leg discharge boot 200. The delivery conduit 104 can be made from any suitable material and can have different shapes. In some embodiments, the delivery conduit 104 can comprise a flexible conduit.

An aqueous foam supply conduit 108 can be in fluid communication with at least one of the slurry mixer 102 and the delivery conduit 104. An aqueous foam from a source can be added to the constituent materials through the foam supply conduit 108 at any suitable location downstream of the mixer 102 and/or in the mixer 102 itself to form a foamed cementitious slurry that is provided to the multi-leg discharge boot 200. In the illustrated embodiment, the foam supply conduit 108 is disposed downstream of the slurry mixer 112. In the illustrated embodiment, the aqueous foam supply conduit 108 has a manifold-type arrangement for supplying foam to an injection ring or block associated with the delivery conduit 104 as described in U.S. Pat. No. 6,874,930, for example.

In other embodiments, one or more secondary foam supply conduits can be provided that are in fluid communication with the mixer 102. In yet other embodiments, the aqueous foam supply conduit(s) can be in fluid communication with the slurry mixer alone 102. As will be appreciated by those skilled in the art, the means for introducing aqueous foam into the cementitious slurry in the slurry mixing and dispensing assembly 100, including its relative location in the assembly, can be varied and/or optimized to provide a uniform dispersion of aqueous foam in the cementitious slurry to produce board that is fit for its intended purpose.

Any suitable foaming agent can be used. Preferably, the aqueous foam is produced in a continuous manner in which a stream of the mix of foaming agent and water is directed to a foam generator, and a stream of the resultant aqueous foam leaves the generator and is directed to and mixed with the cementitious slurry. Some examples of suitable foaming agents are described in U.S. Pat. Nos. 5,683,635 and 5,643,510, for example.

When the foamed cementitious slurry sets and is dried, the foam dispersed in the slurry produces air voids therein which act to lower the overall density of the wallboard. The amount of foam and/or amount of air in the foam can be varied to adjust the dry board density such that the resulting product is within a desired weight range.

One or more flow-modifying elements 106 can be associated with the delivery conduit 104 and adapted to control a main flow of slurry discharged from the slurry mixer 102.

The flow-modifying element(s) 106 can be used to control an operating characteristic of the main flow of aqueous cementitious slurry. In the illustrated embodiment of FIGS. 11 and 12, the flow-modifying element(s) 106 is associated with the discharge conduit 104. Examples of suitable flow-modifying elements include volume restrictors, pressure reducers, constrictor valves, canisters etc., including those described in U.S. Pat. Nos. 6,494,609; 6,874,930; 7,007,914; and 7,296,919, for example.

In use, a main flow of slurry is discharged from the mixer 102 into the delivery conduit 104, aqueous foam is inserted into the main flow through the foam supply conduit 108, and the flow-modifying element(s) 106 controls an operating characteristic of the main flow of slurry. The main flow of slurry is directed into the inlet conduit 202 of the multi-leg discharge boot 200. The main flow of slurry from the mixer 102 is redirected in the inlet conduit 202 and split in the multi-leg discharge boot 200 into a first discharge flow of slurry and a second discharge flow of slurry which are discharged therefrom via the first and second outlet conduits 204, 206, respectively. The multi-leg discharge boot 200 can separate the incoming main flow of slurry from the mixer 102 into two substantially even discharge flows that can be discharged from the multi-leg discharge boot 200 upon an advancing web of cover sheet material, for example, moving along a machine axis 50.

The multi-leg discharge boot 200 can act to slow down the slurry flow and help spread the slurry in a cross-machine axis 60, which is substantially perpendicular to the machine direction 50, across the width of the advancing web of cover sheet material. In various embodiments, the multi-leg discharge boot 200 can have various configurations and sizes depending on the intended slurry volume and the line speed of the board line. Board lines running at higher speeds can use the multiple leg boots to help overcome problems with spreading the slurry along the cross-machine axis 60 in these applications.

Referring to FIG. 12, an exemplary embodiment of a wet end 150 of a gypsum wallboard manufacturing line is shown. The illustrated wet end 150 includes the cementitious slurry mixing and dispensing assembly 100 including the multi-leg discharge boot 200, a hard edge/face skim coat roller 152 disposed upstream of the multi-leg discharge boot 200 and supported over a forming table 154 such that a first moving web 156 of cover sheet material is disposed therebetween, a back skim coat roller 158 disposed over a support element 160 such that a second moving web 162 of cover sheet material is disposed therebetween, and a forming station 164 adapted to shape the preform into a desired thickness. The skim coat rollers 152, 158, the forming table 154, the support element 160, and the forming station 164 can all comprise conventional equipment suitable for their intended purposes as is known in the art. The wet end 150 can be equipped with other conventional equipment as is known in the art.

Water and calcined gypsum can be mixed in the mixer 102 to form an aqueous calcined gypsum slurry. In some embodiments, the water and calcined gypsum can be continuously added to the mixer in a water-to-calcined gypsum ratio from about 0.5 to about 1.3, and in other embodiments of about 0.75 or less.

Gypsum board products are typically formed "face down" such that the advancing web 156 serves as the "face" cover sheet of the finished board. A face skim coat/hard edge stream 166 (a layer of denser aqueous calcined gypsum slurry relative to at least one of the first and second flows of aqueous calcined gypsum slurry) can be applied to the first moving web 156 upstream of the hard edge/face skim coat roller 152, relative to the machine direction 168, to apply a skim coat layer to the first web 156 and to define hard edges of the board.

The multi-leg discharge boot 200 can be used to distribute an aqueous calcined gypsum slurry upon the first advancing web 156. A main flow 121 of aqueous calcined gypsum slurry is discharged from the mixer 102 into the discharge conduit 104 including the multi-leg discharge boot 200. The main flow of aqueous calcined gypsum slurry enters the inlet conduit 202 of the multi-leg discharge boot 200 is directed downwardly in the inlet conduit 202 toward an advancing web of cover sheet material 156 moving in a machine direction 168 upon the forming table 154, is redirected in the inlet conduit 202 such that the main flow of aqueous calcined gypsum slurry is moving substantially along the machine direction 168, and is split therein between the first outlet conduit 204 and the second outlet conduit 206 to define first and second discharge flows 180, 182, respectively. The first and second discharge flows 180, 182 of aqueous calcined gypsum slurry can be discharged from the multi-leg discharge boot 200 upon the first moving web 156.

In embodiments, the first discharge flow 180 of aqueous calcined gypsum and the second discharge flow 182 of aqueous calcined gypsum slurry each has an average velocity that is at least about 50% of the average velocity of the main flow 121 of aqueous calcined gypsum slurry entering the inlet conduit 202 of the multi-leg discharge boot 200. In embodiments, the first discharge flow 180 of aqueous calcined gypsum and the second first discharge flow 182 of aqueous calcined gypsum slurry each has an average velocity that is at least about 70% of the average velocity of the main flow 121 of aqueous calcined gypsum slurry entering the multi-leg discharge boot 200. In embodiments, the first and second discharge flows 180, 182 of aqueous calcined gypsum slurry can have at least one flow characteristic that is substantially similar, such as average velocity, for example.

The face skim coat/hard edge stream 166 can be deposited from the mixer 102 at a point upstream, relative to the direction of movement of the first moving web 156 in the machine direction 168, of where the first and second flows 180, 182 of aqueous calcined gypsum slurry are discharged from the multi-leg discharge boot 200 upon the first moving web 156. The first and second flows 180, 182 of aqueous calcined gypsum slurry can be discharged from the slurry distributor with a reduced average velocity to help prevent "washout" of the face skim coat/hard edge stream 166 deposited on the first moving web 156 (i.e., the situation where a portion of the deposited skim coat layer is displaced from its position upon the moving web 156 in response to the impact of the slurry being deposited upon it).

A back skim coat stream 184 (a layer of denser aqueous calcined gypsum slurry relative to at least one of the first and second flows 180, 182 of aqueous calcined gypsum slurry) can be applied to the second moving web 162. The back skim coat stream 184 can be deposited from the mixer 102 at a point upstream, relative to the direction of movement of the second moving web 162, of the back skim coat roller 158. The second moving web 162 of cover sheet material can be placed upon the slurry discharged from the multi-leg discharge boot 200 upon the advancing first web 156 to for a sandwiched wallboard preform that is fed to the forming station 164 to shape the preform to a desired thickness.

In another aspect of the present disclosure, a multi-leg discharge boot constructed in accordance with principles of the present disclosure can be used in a variety of manufacturing processes. For example, in one embodiment, a multi-leg discharge boot can be used in a method of preparing a gypsum product. A multi-leg discharge boot can be used to split a main flow of aqueous calcined gypsum slurry discharged from a mixer into at least two discharge flows of aqueous calcined gypsum slurry which are discharged from the multi-leg discharge boot.

In embodiments of a method of preparing a cementitious product, a main flow of aqueous slurry can be discharged from a mixer. The main flow of slurry is redirected in an inlet conduit of a multi-leg discharge boot from a main flow entry axis to a main flow discharge axis by a change in direction angle within a range of about ten degrees to about one hundred thirty-five degrees. The main flow of aqueous slurry is moved past a flow restriction in the inlet conduit upstream of a junction portion separating first and second outlet conduits of the multi-leg discharge boot. The main flow of aqueous slurry moving along the main flow discharge axis is split into a first discharge flow of aqueous slurry and a second discharge flow of aqueous slurry in the multi-leg discharge boot. The first and second discharge flows are discharged from the first and second outlet conduits.

In embodiments, first and second guide channels are disposed in flanking relationship to the flow restriction. The first and second guide channels can be in substantial respective alignment with first and second junction openings leading to the first and second outlet conduits, respectively.

In embodiments, the first discharge flow of aqueous slurry and the second feed flow of slurry each has an average velocity that is at least about 50% of the average velocity of the main flow of slurry entering the inlet conduit of the multi-leg discharge boot. In embodiments, the first and second discharge flows of aqueous slurry each has an average velocity that is at least about 75% of the average velocity of the main flow of aqueous slurry entering the inlet conduit of the multi-leg discharge boot. In embodiments, a method of preparing a cementitious product can include discharging the first and second discharge flows of aqueous slurry from the slurry distributor upon a web of cover sheet material moving along a machine direction.

In embodiments, a method of preparing a cementitious product can include compressing a junction portion of the multi-leg discharge boot. The junction portion can be disposed between a first outlet conduit and a second outlet conduit of the multi-leg discharge boot. In embodiments, the junction portion can be compressed periodically according to a predetermined frequency. In embodiments, compressing the junction portion includes moving first and second compressing members toward each other by a predetermined stroke length.

All references cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A multi-leg discharge boot comprising:
   an inlet conduit including an entry segment, a transition segment and a heel portion disposed therebetween,
     the entry segment having an inlet end defining an inlet opening, the entry segment disposed along a main flow entry axis extending between the inlet end and the heel portion,
     the transition segment having a junction end, the transition segment disposed along a main flow discharge axis extending between the heel portion and the junction end, the junction end defining first and second junction openings, the first junction opening being disposed in spaced relationship to the second junction opening, and
     the heel portion having a surface adapted to direct a flow of slurry moving from the inlet opening along the main flow entry axis through the heel portion to the transition segment along the main flow discharge axis;
   a first outlet conduit in fluid communication with the first junction opening of the inlet conduit, the first outlet conduit including a discharge end defining a first discharge opening;
   a second outlet conduit in fluid communication with the second junction opening of the inlet conduit, the second outlet conduit including a discharge end defining a second discharge opening; and
   a junction portion disposed at the junction end of the inlet conduit, the junction portion disposed between the first junction opening and the second junction opening, the junction portion including a substantially planar wall region, the wall region being substantially perpendicular to the main flow discharge axis;
   wherein the inlet conduit defines an inlet passage extending between the inlet opening and the first and second junction openings, and the inlet conduit includes a contoured portion that defines a flow restriction in the inlet passage adjacent the junction portion, and the contoured portion defines first and second guide channels, the flow restriction disposed laterally between the first and second guide channels along a transverse axis substantially perpendicular to the main flow discharge axis, the first and second guide channels each having a cross-sectional area greater than the cross-sectional area of the flow restriction.

2. The multi-leg discharge boot of claim 1, wherein the entry segment is disposed at a feed angle with respect to the transition segment, the feed angle being in a range from about forty five degrees to about one hundred seventy degrees.

3. The multi-leg discharge boot of claim 1, wherein the entry segment is substantially perpendicular to the transition segment.

4. The multi-leg discharge boot of claim 1, wherein the main flow of slurry is redirected from the main flow entry axis to the main flow discharge axis by a change in direction angle within a range of about ten degrees to about one hundred thirty-five degrees.

5. The multi-leg discharge boot of claim 1, wherein the inlet opening of the inlet conduit has a cross-sectional area, the first discharge opening of the first outlet conduit has a cross-sectional area less than or about equal to the cross-sectional area of the inlet opening of the inlet conduit, and the second discharge opening of the second outlet conduit has a cross-sectional area less than or about equal to the cross-section area of the inlet opening of the inlet conduit.

6. The multi-leg discharge boot of claim 5, wherein the cross-sectional area of the first discharge opening of the first outlet conduit is substantially the same as the cross-sectional area of the second discharge opening of the second outlet conduit.

7. The multi-leg discharge boot of claim 5, wherein the cross-sectional area of the first discharge opening of the first outlet conduit is less than about 85% of the cross-section area of the inlet opening of the inlet conduit, and the cross-sectional area of the second discharge opening of the second outlet conduit is less than about 85% of the cross-section area of the inlet opening of the inlet conduit.

8. The multi-leg discharge boot of claim 1, wherein the contoured portion includes an upper convex region and an opposing lower convex region, the upper and lower convex regions projecting toward each other in the inlet passage to define the flow restriction therebetween.

9. The multi-leg discharge boot of claim 1, wherein the first and second guide channels are substantially aligned with the first and second junction openings, respectively.

10. The multi-leg discharge boot of claim 1, wherein the flow restriction has a maximum height along a height axis, the height axis being perpendicular to both the main flow discharge axis and the transverse axis, and the first and second guide channels each having a maximum height along the height axis which is larger than the maximum height of the flow restriction.

11. The multi-leg discharge boot of claim 1, wherein the contoured portion includes an upper convex region and an opposing lower convex region, the upper and lower convex regions projecting toward each other in the inlet passage to define the flow restriction therebetween, and the first and second guide channels disposed laterally outwardly relative to the upper and lower convex regions and being substantially aligned with the first and second junction openings, respectively.

12. The multi-leg discharge boot of claim 1, further comprising:
a compressing device including first and second compressing members disposed in spaced relationship to each other, the junction portion being disposed between the first and second compressing members, at least one of the first and second compressing members being movable over a range of travel relative to the other compressing member along a compressing axis, the compressing axis being substantially perpendicular to the main flow discharge axis, between a normal position and a compressed position wherein a portion of at least one of the inlet conduit and the first and second outlet conduits adjacent the junction portion is compressed relative to the normal position.

13. The multi-leg discharge boot of claim 12, wherein the compressing members each comprise a substantially planar compressing surface, the compressing surfaces being in substantially parallel relationship to each other and to the main flow discharge axis.

14. The multi-leg discharge boot of claim 12, wherein the compressing device includes an actuator adapted to selectively move the first compressing member relative to the second compressing member.

15. The multi-leg discharge boot of claim 14, wherein the compressing device includes a controller adapted to control the actuator such that the actuator is periodically actuated according to a predetermined frequency to periodically compress the junction portion.

16. The multi-leg discharge boot of claim 14, wherein the compressing device includes a controller adapted to control the actuator such that the actuator is actuated to move the first and second compressing members toward each other by a predetermined stroke length.

17. A multi-leg discharge boot comprising:
an inlet conduit including an entry segment, a transition segment and a heel portion disposed therebetween,
the entry segment having an inlet end defining an inlet opening, the entry segment disposed along a main flow entry axis extending between the inlet end and the heel portion,
the transition segment having a junction end, the transition segment disposed along a main flow discharge axis extending between the heel portion and the junction end, the junction end defining first and second junction openings, the first junction opening being disposed in spaced relationship to the second junction opening,
the heel portion having a surface adapted to direct a flow of slurry moving from the inlet opening along the main flow entry axis through the heel portion to the transition segment along the main flow discharge axis, and
the inlet conduit defining an inlet passage extending between the inlet opening and the first and second junction openings;
a first outlet conduit in fluid communication with the first junction opening of the inlet conduit, the first outlet conduit including a discharge end defining a first discharge opening;
a second outlet conduit in fluid communication with the second junction opening of the inlet conduit, the second outlet conduit including a discharge end defining a second discharge opening; and
a junction portion disposed at the junction end of the inlet conduit, the junction portion disposed between the first junction opening and the second junction opening;
wherein the inlet conduit includes a contoured portion that defines a flow restriction in the inlet passage adjacent the junction portion, the contoured portion defining first and second guide channels, the flow restriction disposed laterally between the first and second guide channels along a transverse axis substantially perpendicular to the main flow discharge axis, the first and second guide channels each having a cross-sectional area greater than the cross-sectional area of the flow restriction.

18. The multi-leg discharge boot of claim 17, wherein the first and second guide channels are substantially aligned with the first and second junction openings, respectively.

19. The multi-leg discharge boot of claim 17, further comprising:
a compressing device including first and second compressing members disposed in spaced relationship to each other, the contoured portion and the junction portion being disposed between the first and second compressing members, at least one of the first and second compressing members being movable over a range of travel relative to the other compressing member along a compressing axis, the compressing axis being substantially perpendicular to the main flow discharge axis, between a normal position and a compressed position wherein at least one of the contoured portion and the junction portion is compressed relative to the normal position.

20. A cementitious slurry mixing and dispensing assembly comprising:
a mixer adapted to agitate water and a cementitious material to form an aqueous cementitious slurry;
a multi-leg discharge boot in fluid communication with the mixer, the multi-leg discharge boot including:
an inlet conduit including an entry segment, a transition segment and a heel portion disposed therebetween,
the entry segment having an inlet end defining an inlet opening, the entry segment disposed along a main flow entry axis extending between the inlet end and the heel portion,
the transition segment having a junction end, the transition segment disposed along a main flow discharge axis extending between the heel portion and the junction end, the junction end defining first and second junction openings, the first junction opening being disposed in spaced relationship to the second junction opening, and
the heel portion having a surface adapted to direct a flow of slurry moving from the inlet opening along the main flow entry axis through the heel portion to the transition segment along the main flow discharge axis,
a first outlet conduit in fluid communication with the first junction opening of the inlet conduit, the first outlet conduit including a discharge end defining a first discharge opening,
a second outlet conduit in fluid communication with the second junction opening of the inlet conduit, the second outlet conduit including a discharge end defining a second discharge opening, and
a junction portion disposed at the junction end of the inlet conduit, the junction portion disposed between the first junction opening and the second junction opening, the junction portion including a substantially planar wall region, the wall region being substantially perpendicular to the main flow discharge axis.

21. The cementitious slurry mixing and dispensing assembly of claim 20, wherein the multi-leg discharge boot comprises a terminal portion of a discharge conduit in fluid communication with the mixer.

22. The cementitious slurry mixing and dispensing assembly of claim 20, wherein the inlet conduit defines an inlet passage extending between the inlet opening and the first and second junction openings, and the inlet conduit includes a contoured portion that defines a flow restriction in the inlet passage adjacent the junction portion.

23. The cementitious slurry mixing and dispensing assembly of claim 20, further comprising:
a compressing device including first and second compressing members disposed in spaced relationship to each other, the contoured portion and the junction portion being disposed between the first and second compressing members, at least one of the first and second compressing members being movable over a range of travel relative to the other compressing member along a compressing axis, the compressing axis being substantially perpendicular to the main flow discharge axis, between a normal position and a compressed position wherein at least one of the contoured portion and the junction portion is compressed relative to the normal position.

24. A cementitious slurry mixing and dispensing assembly comprising:
a mixer adapted to agitate water and a cementitious material to form an aqueous cementitious slurry;
a multi-leg discharge boot in fluid communication with the mixer, the multi-leg discharge boot including:
an inlet conduit including an entry segment, a transition segment and a heel portion disposed therebetween,
the entry segment having an inlet end defining an inlet opening, the entry segment disposed along a main flow entry axis extending between the inlet end and the heel portion,
the transition segment having a junction end, the transition segment disposed along a main flow discharge axis extending between the heel portion and the junction end, the junction end defining first and second junction openings, the first junction opening being disposed in spaced relationship to the second junction opening,
the heel portion having a surface adapted to direct a flow of slurry moving from the inlet opening along the main flow entry axis through the heel portion to the transition segment along the main flow discharge axis, and
the inlet conduit defining an inlet passage extending between the inlet opening and the first and second junction openings,
a first outlet conduit in fluid communication with the first junction opening of the inlet conduit, the first outlet conduit including a discharge end defining a first discharge opening,
a second outlet conduit in fluid communication with the second junction opening of the inlet conduit, the second outlet conduit including a discharge end defining a second discharge opening, and
a junction portion disposed at the junction end of the inlet conduit, the junction portion disposed between the first junction opening and the second junction opening,
wherein the inlet conduit includes a contoured portion that defines a flow restriction in the inlet passage adjacent the junction portion.

* * * * *